US011620682B2

(12) United States Patent
Dinh

(10) Patent No.: US 11,620,682 B2
(45) Date of Patent: Apr. 4, 2023

(54) APPARATUS AND METHOD FOR ONLINE DATA COLLECTION AND PROCESSING

(71) Applicant: MIJEM INC., Toronto (CA)

(72) Inventor: Phuong Dinh, Toronto (CA)

(73) Assignee: MIJEM INC., Toronto (CA)

( * ) Notice: Subject to any disclaimer, the term of this patent is extended or adjusted under 35 U.S.C. 154(b) by 0 days.

(21) Appl. No.: 15/509,979

(22) PCT Filed: Sep. 18, 2015

(86) PCT No.: PCT/CA2015/050919
§ 371 (c)(1),
(2) Date: Mar. 9, 2017

(87) PCT Pub. No.: WO2016/041089
PCT Pub. Date: Mar. 24, 2016

(65) Prior Publication Data
US 2017/0249671 A1 Aug. 31, 2017

Related U.S. Application Data

(60) Provisional application No. 62/052,645, filed on Sep. 19, 2014.

(51) Int. Cl.
*G06Q 30/0251* (2023.01)
*G06F 16/248* (2019.01)
(Continued)

(52) U.S. Cl.
CPC ....... *G06Q 30/0269* (2013.01); *G06F 16/248* (2019.01); *G06F 16/24578* (2019.01);
(Continued)

(58) Field of Classification Search
CPC .... G06Q 30/02; G06Q 30/06; G06Q 30/0269; G06Q 30/0253; G06Q 30/0631; G06Q 30/0643; G06F 16/24578; G06F 16/248
See application file for complete search history.

(56) References Cited

U.S. PATENT DOCUMENTS

| 10,559,019 B1 * | 2/2020 | Beauvais ............... G06T 19/006 |
| 2007/0214250 A1 * | 9/2007 | Ahmed .................. G06Q 30/08 |
| | | 709/223 |

(Continued)

FOREIGN PATENT DOCUMENTS

WO 2013138057 9/2013

OTHER PUBLICATIONS

Kapoor, et al., "Brand-related, Consumer to Consumer, Communication via Social Media," IIM Kozhikode Society & Management Review, vol. 2, No. 1, pp. 43-59 (Year: 2013).*

(Continued)

*Primary Examiner* — James M Detweiler
*Assistant Examiner* — Patrick Kim
(74) *Attorney, Agent, or Firm* — Gowling WLG (Canada) LLP

(57) ABSTRACT

The disclosure is directed at a method for data collection and processing within an online system which monitors a user's activity on the online system and then creates a list of business offers for display to the user. The list of business offers is not displayed to the user until the user performs an action relating to a request to review the list of business offers.

16 Claims, 27 Drawing Sheets

(51) Int. Cl.
    *G06F 16/2457*    (2019.01)
    *G06Q 30/0601*    (2023.01)
(52) U.S. Cl.
    CPC ..... *G06Q 30/0253* (2013.01); *G06Q 30/0631* (2013.01); *G06Q 30/0643* (2013.01)

(56) References Cited

U.S. PATENT DOCUMENTS

| | | | | |
|---|---|---|---|---|
| 2011/0264519 | A1* | 10/2011 | Chan | G06Q 30/02 705/14.49 |
| 2011/0282943 | A1* | 11/2011 | Anderson | H04L 43/04 709/204 |
| 2012/0130784 | A1* | 5/2012 | Neuhauser | G06Q 30/0214 705/14.16 |
| 2012/0239486 | A1* | 9/2012 | Hu | G06Q 30/0269 705/14.39 |
| 2013/0304576 | A1* | 11/2013 | Berland | G06Q 50/01 705/14.53 |
| 2014/0006132 | A1* | 1/2014 | Barker | G06Q 50/01 705/14.25 |
| 2014/0035913 | A1* | 2/2014 | Higgins | G06Q 30/0641 345/420 |
| 2014/0165012 | A1* | 6/2014 | Shen | G06F 9/4451 715/863 |
| 2014/0278976 | A1* | 9/2014 | Braytenbaum | G06Q 30/0255 705/14.53 |
| 2015/0058083 | A1* | 2/2015 | Herrero | G06Q 10/087 705/7.32 |
| 2015/0294356 | A1* | 10/2015 | Devecka | G06Q 30/0255 705/14.53 |

OTHER PUBLICATIONS

Canadian Intellectual Property Office as International Searching Authority, International Seach Report and Written Opinion on PCT Appln. No. PCT/CA2015/050919, dated Nov. 25, 2015.

* cited by examiner

APPARATUS AND METHOD FOR ONLINE DATA COLLECTION AND PROCESSING

CROSS-REFERENCE TO RELATED APPLICATIONS

This application claims the benefit of U.S. Patent Application No. 62/052,645, filed Sep. 19, 2014, which is hereby incorporated by reference in its entirety.

FIELD OF THE DISCLOSURE

The disclosure is generally directed at data collection and more specifically at an apparatus and method for online data collection and processing.

BACKGROUND OF THE DISCLOSURE

Online communities have been a growing trend over the past several years and continue to develop as individuals increase the amount of information that they share online. The development of these online communities allows individuals who share common interests to communicate and share information with each other in a forum which is dedicated to the shared common interest.

As these online communities grow in membership, the amount of shared information or data also increases whereby new functionalities for these online communities may be created. In creating these new functionalities, there is a need to maintain control of all the information that is being shared within the online community.

Therefore, there is provided a novel apparatus and method for online data collection and processing.

SUMMARY OF THE DISCLOSURE

The disclosure is directed at an apparatus and method of online data collection and processing. In a preferred embodiment, the disclosure provides an online closet, within the context of an online closet community, whereby users may archive their assets (electronics, clothing, handbags, shoes, jewelry, tickets, etc.) by uploading pictures and asset data to an online database. The online closet also allows for other users to socialize their assets to other members of the online closet community by allowing users to sell their assets to other members, have other members analyze their asset values, or to view the assets of other members.

In addition to the social aspects, the technology for implementing the online closet and online closet community may also help the user engage in consumer-to-consumer (C2C) transactions. By using the system of the disclosure, the user may encounter features, in the form of novel technologies, methods, or processes which provide an apparatus of method of online data collection and processing.

In one aspect of the disclosure, there is provided a method for data collection and processing within an online system including receiving and storing records which are associated with a user from a database; monitoring user activity on the system via a processor; creating a list of business offers based on user activity on the system; sensing user action to review list of business offers; and transmitting list of business offers to a display screen associated with a user via an output module within the online system.

In another aspect, there is provided a method of data collection and processing including receiving an input from a user requesting a trade or sale status change for a record stored in a database; determining if the user has requested for trade or for sale status change or a not for trade or not for sale status change; setting a for trade or for sale flag, associated with the record, on if the request is for a for trade or for sale status change; and setting a for trade or for sale flag, associated with the record, off if the request is for a not for trade or not for sale status change.

In yet another aspect, there is provided a system for data collection and processing including a compatibility module for comparing business offers with user activity or user preference to create compatibility information; a business offers module for determining a list of business offers that should be delivered to a user based on compatibility information; an output module for creating a display page for viewing by a user based on the list of business offers; a transmission module for transmitting the display page to a user device; and a processor for sensing a user request for the list of business offers prior to creating and displaying the display page.

BRIEF DESCRIPTION OF THE DRAWINGS

Embodiments of the present disclosure will now be described, by way of example only, with reference to the attached Figures.

DETAILED DESCRIPTION

The disclosure is directed at a method and apparatus for data collection and processing. In the preferred embodiment, the apparatus is provided in the form of an online closet community where users may store photos, pictures or images of items which are in a user's closet. The users may also interact with other members of the online closet community to message other members, view their items and buy or sell items from and to other members. Within the apparatus, there is provided other methods and systems for enabling data collection and processing.

Figure 1A:
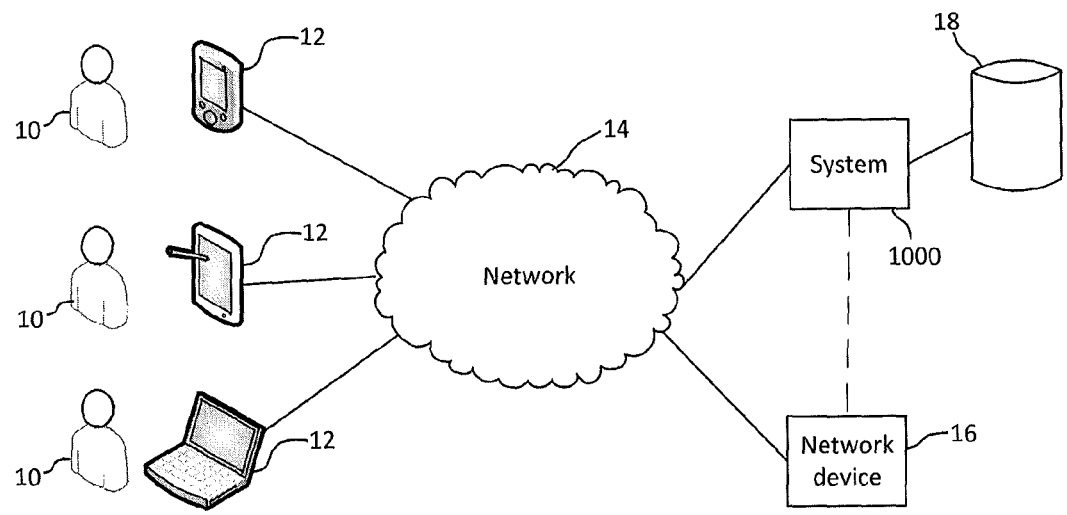
FIG. 1a is a schematic diagram of apparatus for online communication.

Turning to FIG. 1a, a schematic diagram of apparatus for online communication is shown. The apparatus includes users, or members, 10 which use a variety of user devices 12, for example, laptop computers, desktop computers, tablets, mobile phones, smartphones, televisions, or the like, for accessing a network 14, for example, the Internet, a Local Area Network (LAN), a Virtual Local Area Network (VLAN), a Wide Area Network (WAN), a Virtual Private Network (VPN), or the like.

Users 10 access electronic content from one or more network devices 16 via the network 14. A system 1000 may be partly incorporated in one of the network devices 16 or may be configured using a stand-alone network device operatively connected to one or more network devices. The operative connection may be via a direct connection (shown in dotted lines) or via the network 14. The system 1000 may also be operatively connected to at least one external database 18. The system 1000 may query the database 18 and may retrieve electronic content from the database 18.

In a preferred embodiment, an application is stored on each of the devices 12 which allows the user 10 to interact with the system 1000 to access the system for data collection and processing.

Figure 1B:
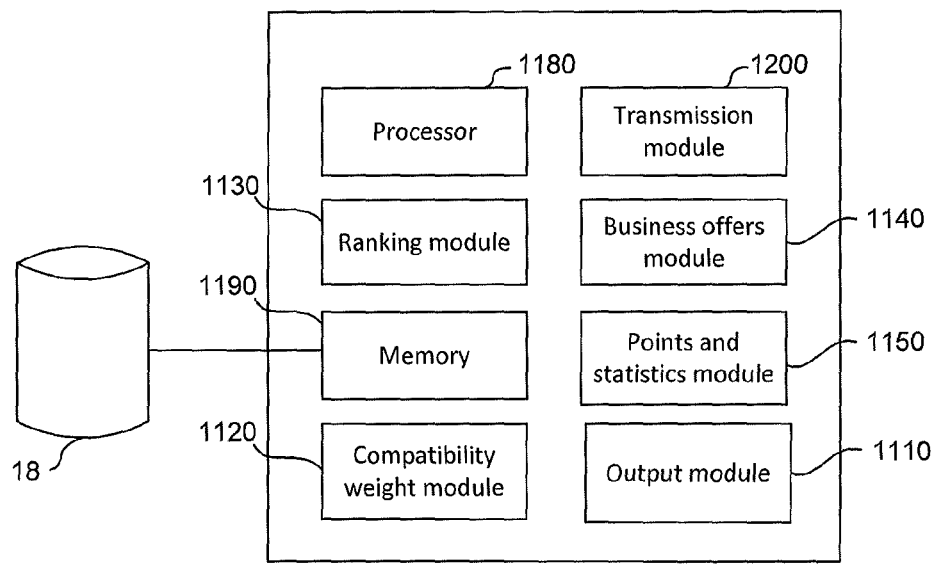
FIG. 1b is a schematic diagram of a system for data collection and processing.

FIG. 1b illustrates the system 1000 for data collection and processing according to an embodiment. The system 1000 includes an output module 1110, a compatibility weight module 1120, a ranking module 1130, a business offers module 1140 and a points and statistics module 1150. The system 1000 also includes a processor 1180, a memory module 1190, and a transmission module 1200.

The output module 1110 is configured to create or produce display screens which are to be displayed on the user devices depending on the action being performed by the user. The output module communicates with the processor 1180 or the database 18 or both to obtain the content for the display screen or page.

The compatibility weight module 1120 performs calculations to determine how compatible a user is with business offers which are being provided by companies or members. The compatibility weight module 1120 communicate with the processor 1180, the database 18 or the business offers module 1140, or any combination of these three to determine if certain business offers should be delivered for display on the user's device 12 by the system 1000.

The ranking module 1130 is configured to determine how content from the system 1000 should be displayed on the user's device. For instance, based on user activity or preferences, some content may be shown first, or at a top of a list, to the user based on the determination by the ranking module.

The business offers module 1140 is configured to determine which business offers should be delivered to which users. By performing certain functionality, as will be outlined below, the business offer module determines a relationship between the user and a business offer so that the user gets to review relevant offers.

The points and statistics module 1150 is configured to calculate points that a user has earned based on, in one embodiment, the user's engagement with the system 1000. The user's statistics such as the value of their assets may also be determined and stored by the points and statists module 1150.

The system 1000 further includes the processor 1800. The processor 1180 is configured to execute instructions from the other modules of the system 1000. In some cases, the processor 1180 may be a central processing unit. In other cases, each module may be operatively connected to a separate processor. The system further includes a memory module 1190, for example a database, random access memory, read only memory, or the like.

The transmission module 1200 is configured to receive and transmit data to and from the network 14, the network device 16 or the like. The transmission module 1200 may be, for example, a communication module configured to communicate between another device and/or the network 14. The transmission module 1200 may receive or intercept a request from a user, via the network, to access the system 1100. In some cases, the user request may be directed to the system. In other cases, the transmission module 1200 may intercept a request directed to a network device 16.

In operation, a user registers for an account for the system, such as in the form of an individual online closet where the system is an online community for a user's closet. The registration process may be varied but typically includes the requirement of a user to input information such as, but not limited to, a user name, the user's email address, a password and other demographic information. Such a registration process will be understood by one skilled in the art. Once registered, the user can access the system for data collection and processing, or in other words, their online closet within the online closet community.

Figure 2:
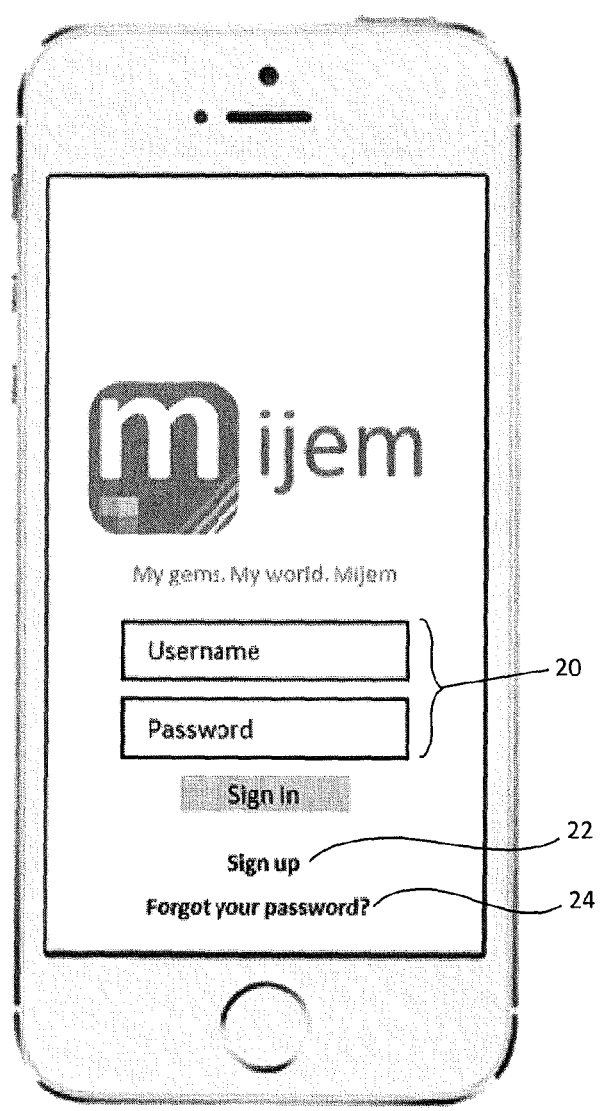
FIG. 2 is a schematic diagram of a login screen for the system of FIG. 1b.

In one mode of operation, when initially accessing the user's online closet, the system, such as via the output module 1110 and the transmission module 1200, provides the user with a log in screen as schematically shown in FIG. 2 if the user is accessing the system via a smartphone device. When the user accesses the log in screen of the system, the user has the option to sign in 20, sign up for a new account 22 or reset a password 24.

Figure 3:
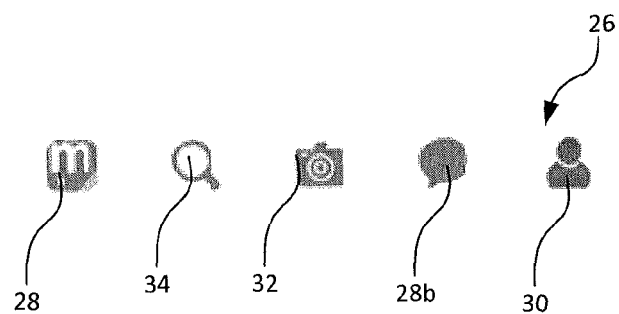
FIG. 3 is a schematic diagram of a menu bar for use with the system of FIG. 1b.

Once the user has logged in to their account within the system, or online closet community, the system may provide a menu bar 26, such as schematically shown in FIG. 3, allowing the user to select functionality to execute or perform. For example, the user may review 30 the items which they have stored in their account or online closet. These items may also be seen as assets. Assets may include, but are not limited to, electronics, clothing, handbags, shoes, jewelry or tickets.

The user may also be able to access a social customer to customer (C2C) centre 28 where the user may view assets of other user's or members of the system, access a marketplace to view assets which other user's may be interested in selling; access the user's own messages 28b or to review any deals which may be available to the user. In a preferred embodiment, the deal or deals which are available to the user may be selected based on the assets of the user, activity data of the users, or based on preferences of the user. This is disclosed in more detail below. The user may also be able to archive, or store, assets 32 in their closet, and search the online closet community 34. In another embodiment, the menu bar may provide the option for a user to review their points and statistics.

When changes are made to a user's account, or online closet, the interaction between the user (via the device) and the processing unit is stored in the database in order to update the database to reflect changes.

Figure 6B:
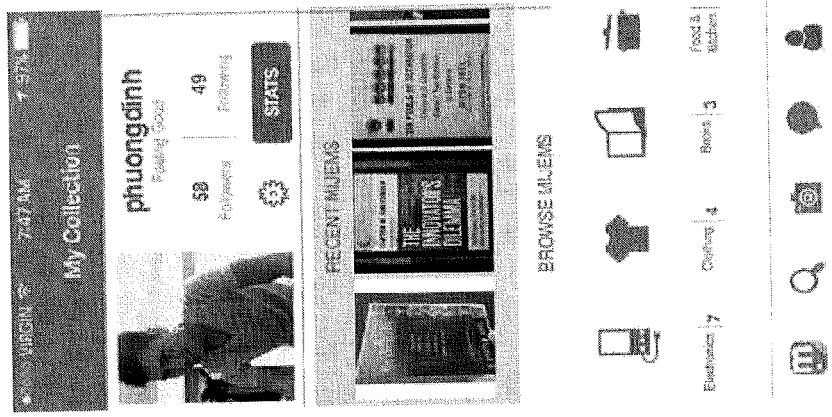
FIG. 6b is a schematic diagram of another embodiment of a user's own profile screen for reviewing assets.
Figure 6A:
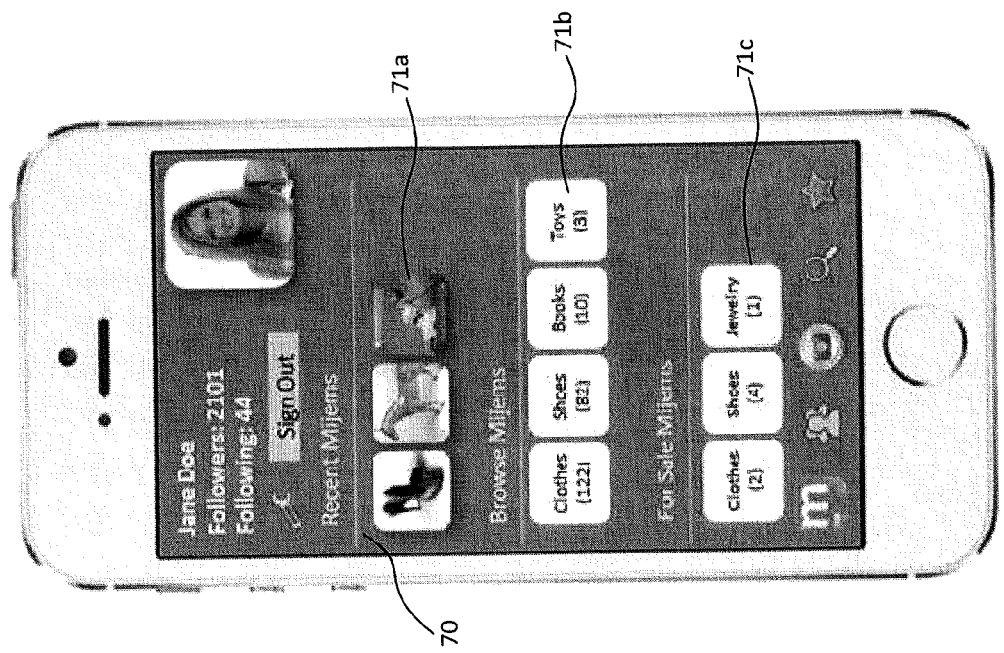
FIG. 6a is a schematic diagram of a user's own profile screen for reviewing assets.

If the user decides to review their assets 30, the system may provide a display page, such as that shown in FIG. 6a or FIG. 6b. In the display page, certain demographic information and/or functionalities are provided to the user. For instance, the display page 70 may display static information such as, but not limited to, the user's name; a profile picture; user statistics; or functionality such as, but not limited to, sign or log out functionality; functionality to change user settings; functionality to view recently archived, or stored, assets 71a; functionality to browse assets 71b and/or functionality to view assets which are for sale or for trade 71c. The assets which are associated with a category may also be tagged with a count.

Figure 8C:
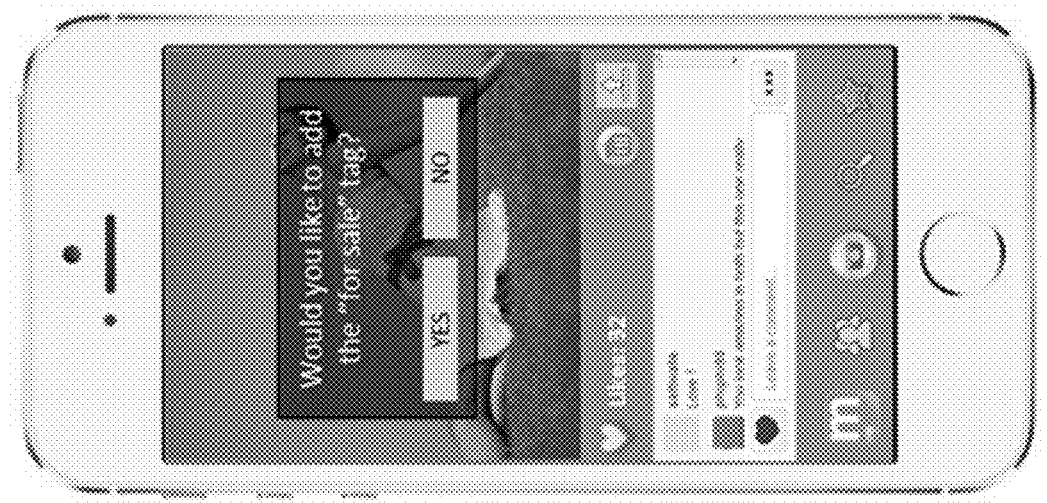
FIG. 8c is a schematic diagram of a display screen for updating status of an asset.
Figure 8B:
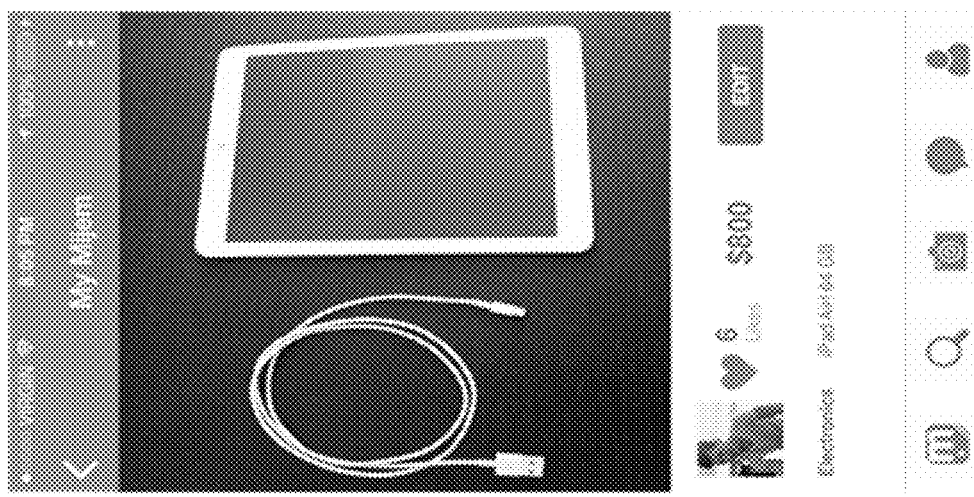
FIG. 8b is another schematic diagram of a display screen for an asset.
Figure 8A:
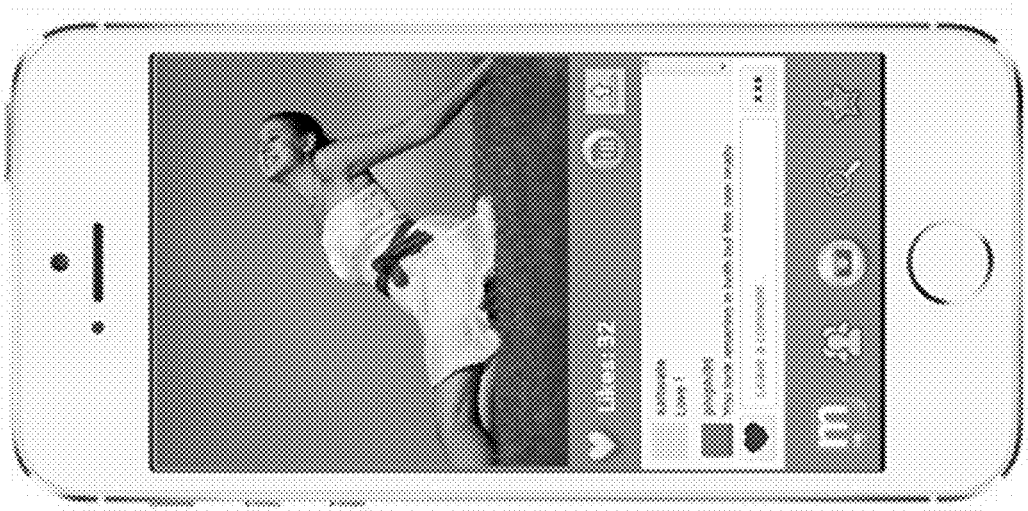
FIG. 8a is a schematic diagram of a display screen for an asset.

If a user decides to review one of the assets 71a, the user may be provided with an asset display page, such as schematically shown in FIG. 8a or FIG. 8b. Within the asset display page, the user may be able to, but is not limited to, view a picture or photo of the asset; view the number of likes associated with the asset; view comments relating to the asset; view details on the asset. In the current embodiment, the asset belongs to the user when the asset is one that was uploaded or stored by the user in their online account.

Figure 9:
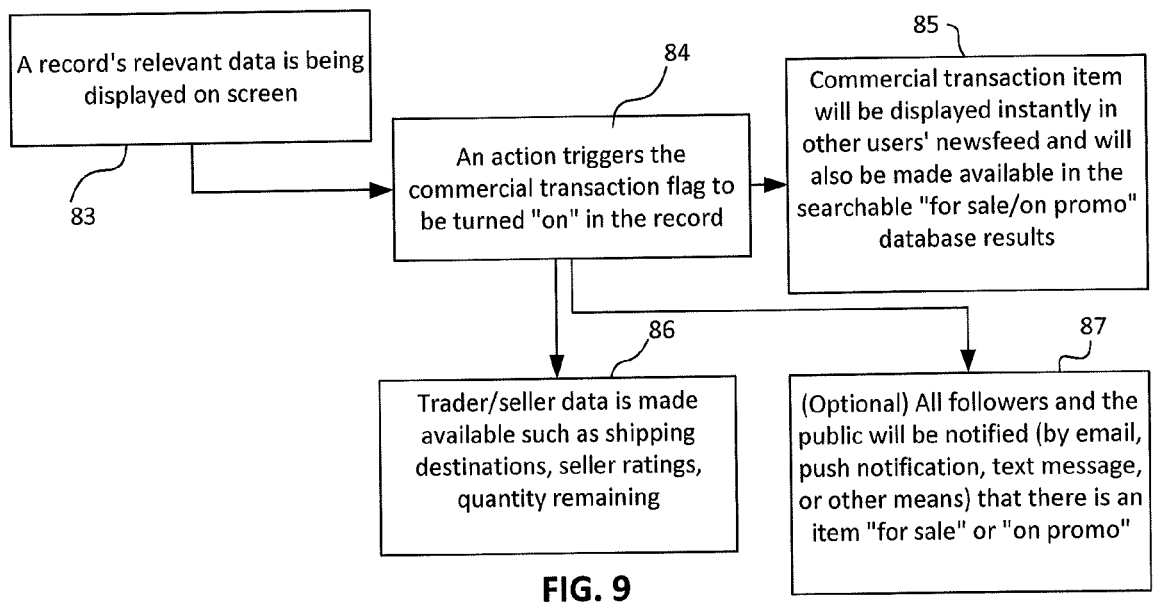
FIG. 9 is a flowchart outlining a method of updating a status of a record.

In one embodiment, the user may assign the "for trade" status by clicking on a button, touching the picture, dragging the picture, or swiping along the picture. The asset may also be assigned a "for sale" status. It will be understood that instead of "for trade" status, the asset may also be designated "on promo" status. "For sale" relates to an item which may be sold in exchange for cash while "for trade" relates to an item which may be sold or exchanged for other items. Subsequently the user may be prompted to confirm whether he or she wants to assign the asset an updated status (such as schematically shown in FIG. 8c). A flowchart outlining a general method of turning a record, or asset, into a "for trade status", "for sale" status, or "on promo" status, or collectively a commercial transaction status, is shown in FIG. 9. Initially, the record is shown on a display screen 83 and then when an action to trigger, such as by clicking on a button, touching the picture, dragging the picture or swiping along the picture, a status change request is sensed, the user is prompted to confirm whether they wish to assign a "for sale" status, a "for trade" status, an "on promo" status, or "do nothing". In one embodiment, the status is turned on 84 by setting a flag. The database is then updated and other members of the system of online closet community are notified that the particular asset has been assigned a new status and may be searched with its new status 85.

Concurrently, after the flag has been set, the user's data, such as, but not limited to, shipping destinations, seller ratings and quantity remaining, may be made available 86. Optionally, other members of the community may be notified that there is a new item has been assigned a "for sale", "for trade" or "on promo" status 87

Figure 10A:
FIG. 10a is a schematic diagram of an asset for trade or for sale display page.
Figure 10B:
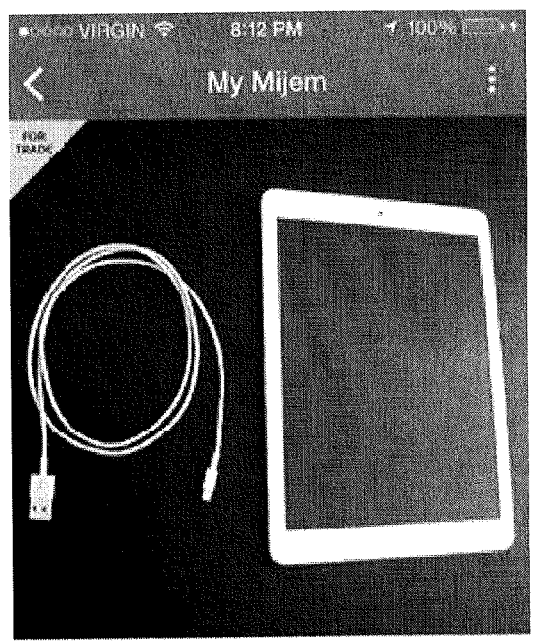
FIG. 10b is another schematic diagram of an asset for trade of for sale display page.

When a user selects an asset having a "for trade" or "for sale" status, the system may provide the user with an asset "for trade" or "for sale" display page or screen, such as schematically shown in FIG. 10a or FIG. 10b.

In the current embodiment, the asset "for trade" display page provided by the system allows the user to perform various functionality which include, but are not limited to, view the picture of the asset; view data associated to the asset such as the number of likes associated with the asset, comments on the asset or a description of the asset; view the ratings of the seller associated with the asset; message the seller of the asset; delete the picture of the asset (if the asset belongs to the user); view details on the asset or change the "for trade" status of the asset into a "not for trade" status (if the asset belongs to the user).

Figure 10C:
FIG. 10c is a schematic diagram of another display screen for updating a status of an asset.
Figure 10D:
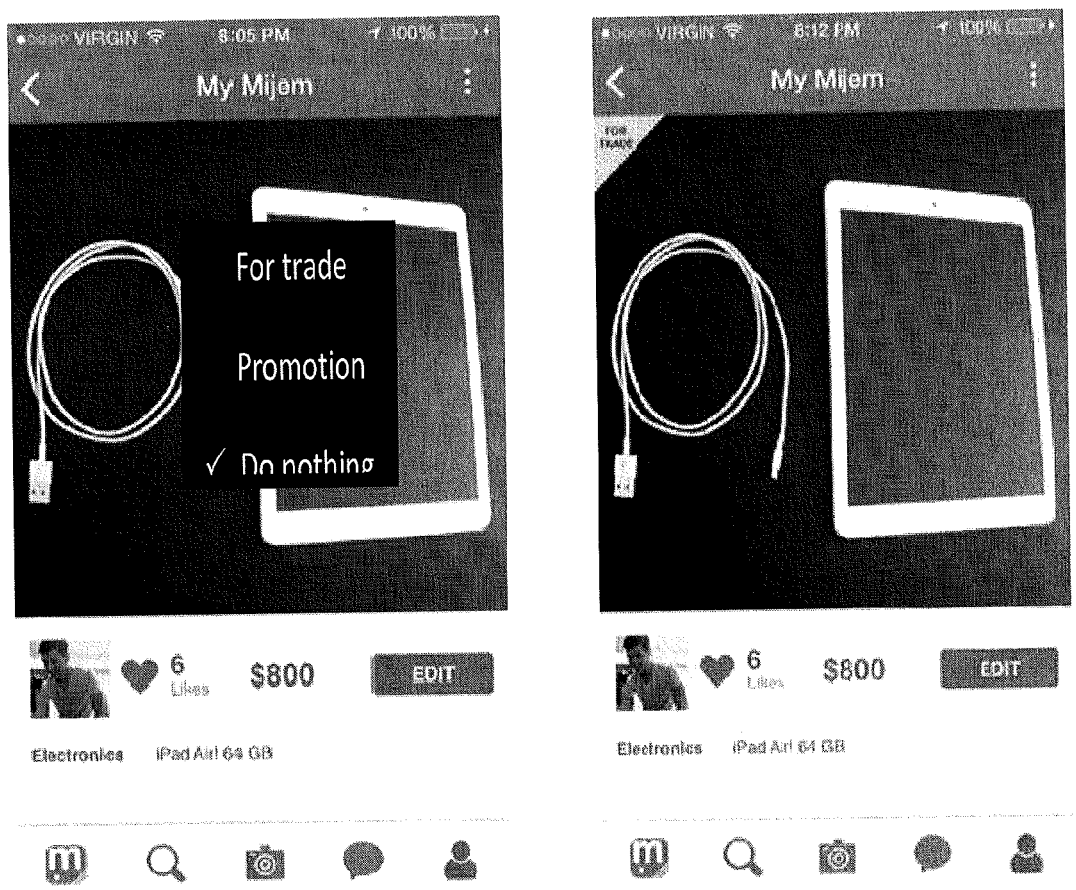
FIG. 10d is a schematic diagram of display screens for an action initiated and an action completed.
Figure 10E:
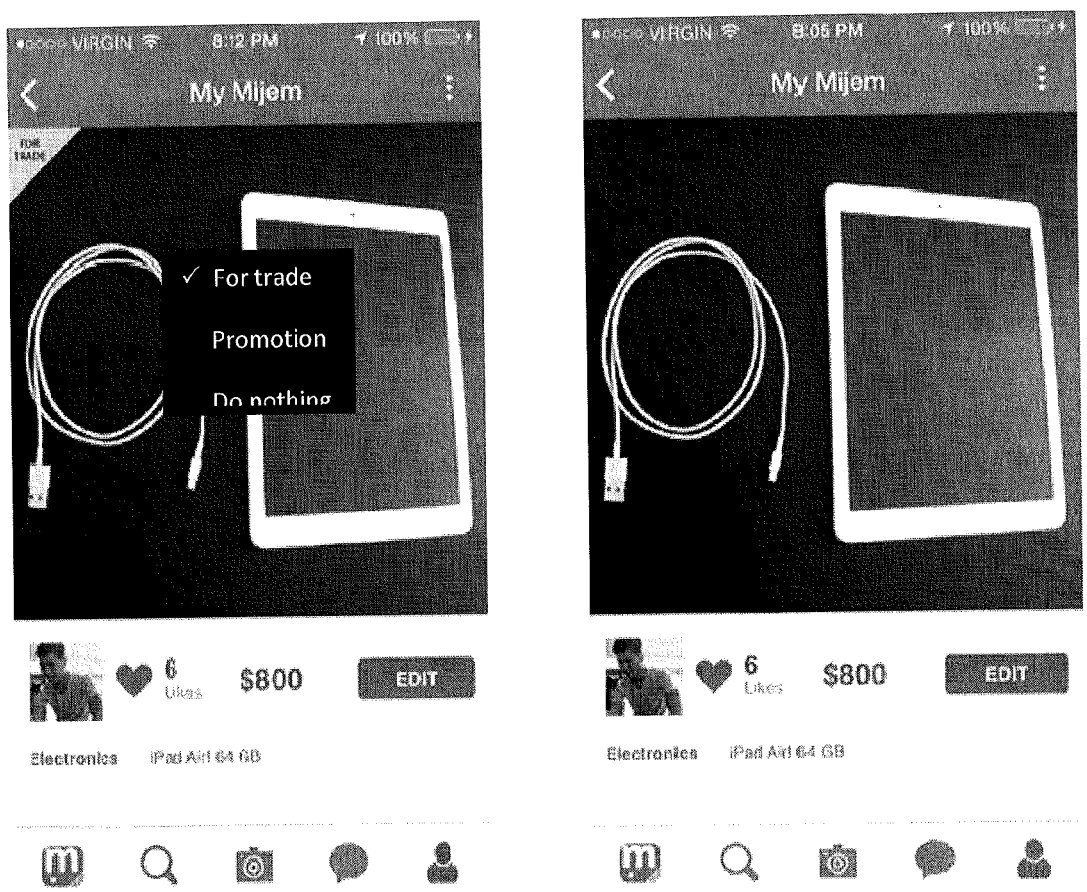
FIG. 10e is a schematic diagram of another embodiment of display screens for an action initiated screen and an action completed screen.

In one embodiment, to convert the asset from a "for trade" status, "for sale" status, or "on promo" status to a "not for trade status", the user may click on a button, touch the picture, drag the picture of the asset, or swipe along the picture. Subsequently, the user may be prompted to confirm whether they want to update the asset status. An example of such a display page or screen is schematically shown in FIG. 10c. If the "not for trade" status of an asset has been set, the asset will no longer be displayed "for trade" in other member's newsfeeds and cannot be searched by other members or users of the system. Similar actions are performed for turning off the "for sale" status or the "on promo" status. FIG. 10d provides a schematic diagram of another embodiment of an action initiated screen (left) and an action completed screen (right) with respect to updating a status of an asset. In FIG. 10d, the user has the option to assign a status of "for trade" or "promotion" to the asset or also "do nothing". As shown in the action completed screen of FIG. 10d, the user has decided to assign a for trade status to the asset. FIG. 10e provides a schematic diagram of another embodiment of an action initiated screen (left) and an action completed screen (right) with respect to updating a status of an asset. In FIG. 10e, the user has the option to un-assign a status of "for trade" to a "promotion" status or a "do nothing" status. As shown in the action completed screen of FIG. 10e, the user has decided to remove the "for trade" status from the asset.

Figure 11:
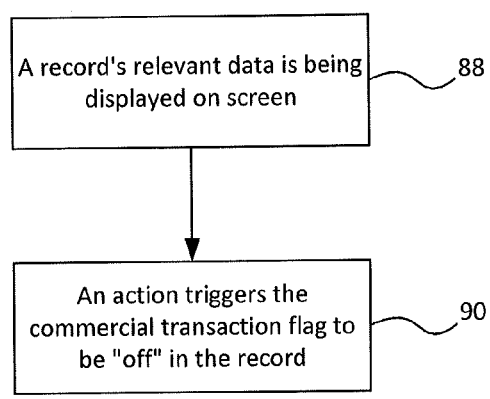
FIG. 11 is a flowchart outlining another method of updating a status of a record.

A flowchart outlining a method of turning a record from a "for trade", "for sale" or "on promo" status to a "not for trade/sale/promo" status is shown in FIG. 11. Initially, the record is shown on a display screen 88 and then when an action to trigger the "for trade" status to be turned off is sensed 90, a flag may be set or unset, to reflect the updated status. This is performed in a similar manner as described above with setting the flag.

Figure 12B:
FIG. 12b is a schematic diagram of another asset data edit display page.
Figure 12A:
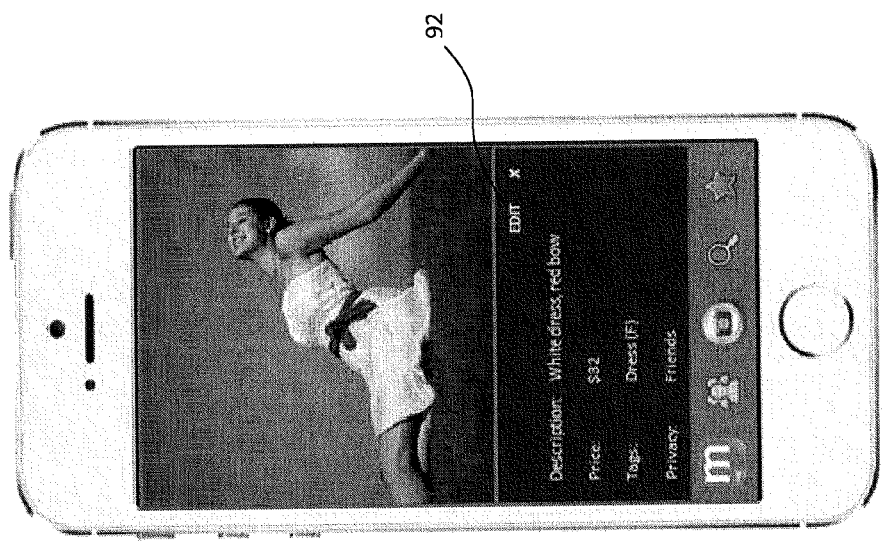
FIG. 12a is a schematic diagram of an asset data edit display page.

A user may also edit the details of any of their assets by accessing an asset display page which is provided by the system of the disclosure. Different schematic diagrams of an asset display page are provided in FIGS. 12a and 12b. By clicking an "edit" button 92 (or save button 92), the user may then save the data associated with the asset.

Figure 13D:
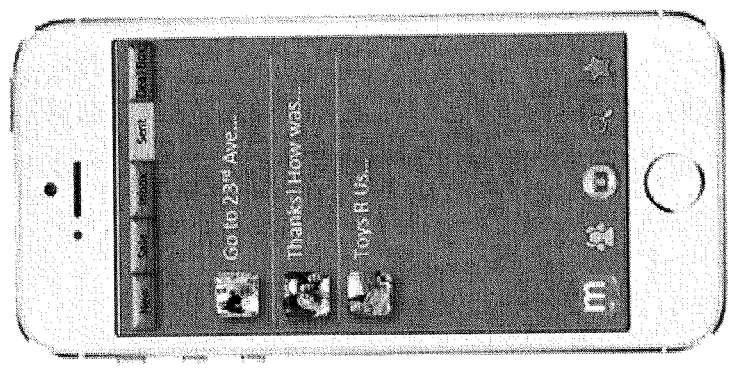
FIGS. 13a to 13i are schematic diagrams of the system.
Figure 13C:
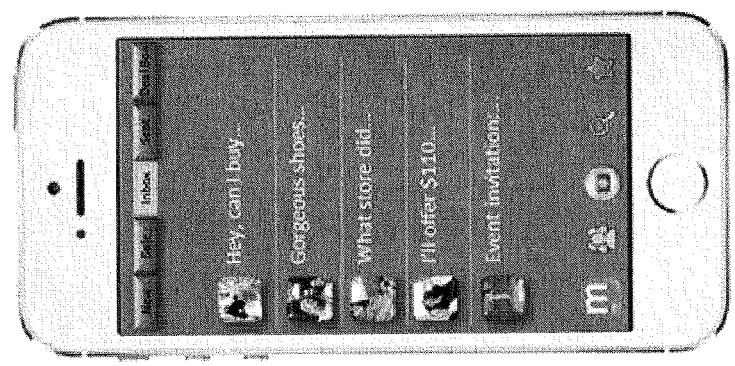
Figure 13B:
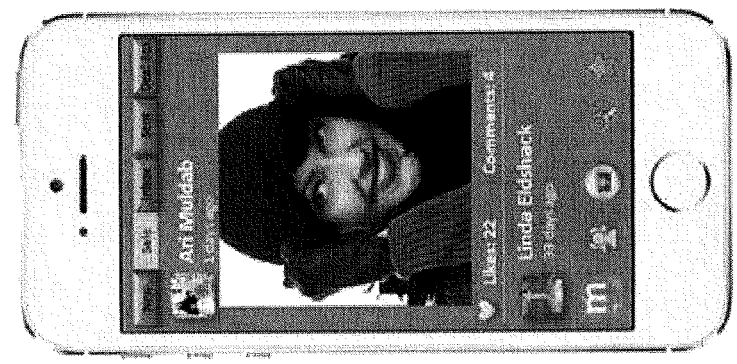
Figure 13A:

If the user decides to access the social customer to customer (C2C) centre 28 from the menu bar shown in FIG. 3, the system provides the user with an opportunity to view various display screens relating to, but not limited to, new assets posted recently by their network or the online closet community (FIG. 13a or FIG. 13g); assets with a "for trade", "for sale" or "on promo" status posted recently by their network or the online closet community (FIG. 13b or FIG. 13h) Within the system, the user may decide to look at all assets within the system or may limit the scope of their review by selecting a smaller subset of members from their own personal network.

Figure 13F:
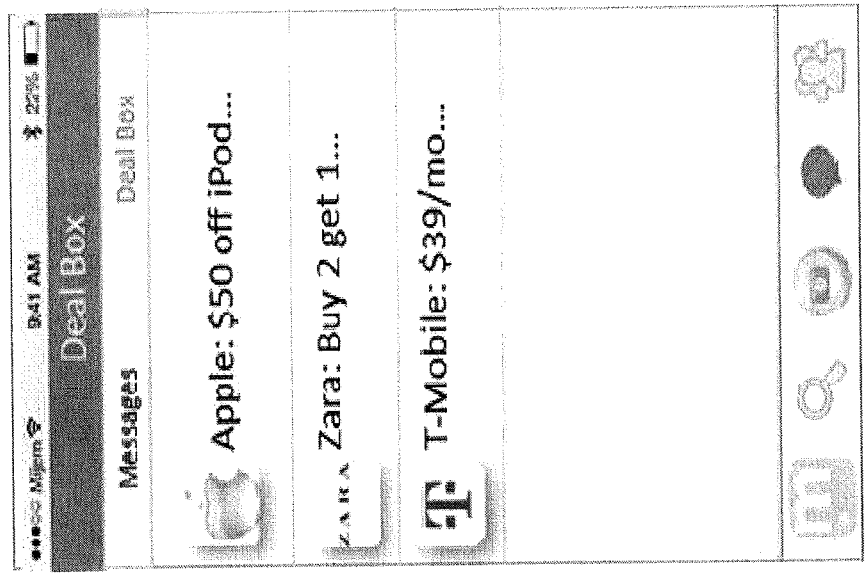
Figure 13E:
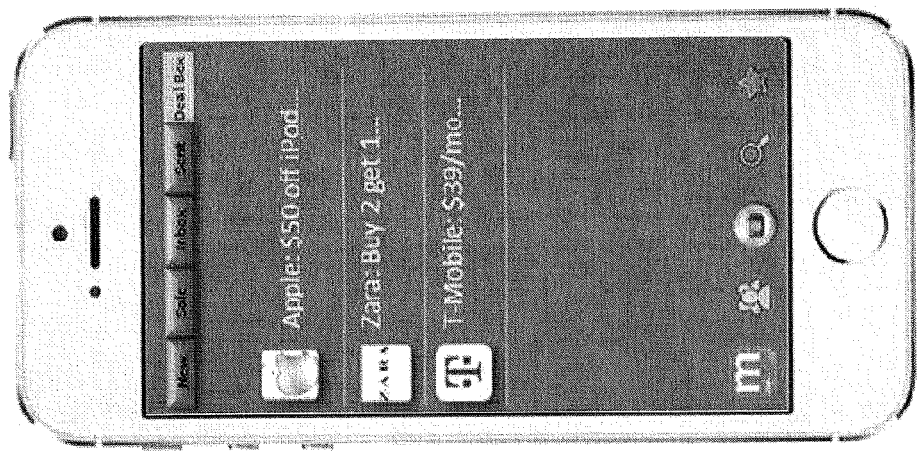
Figures 13G, 13H, 13I:
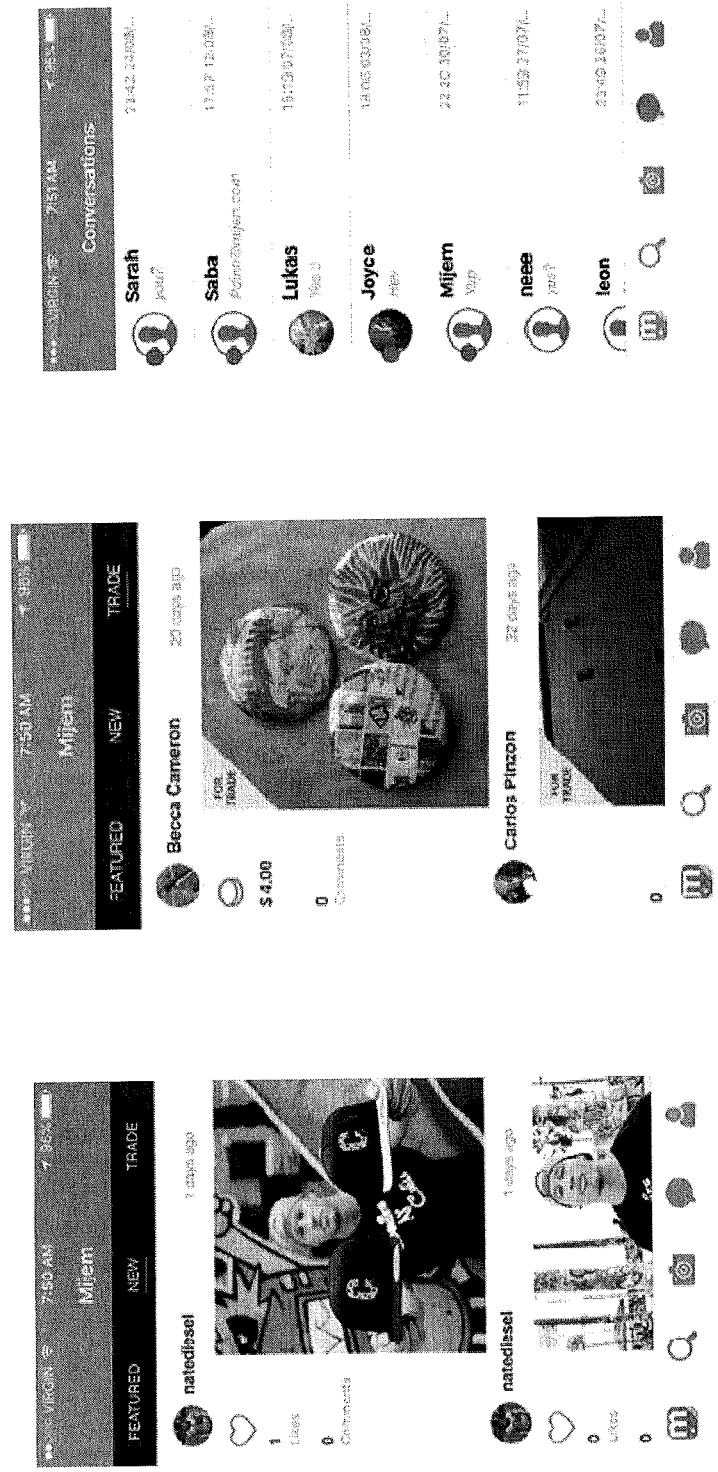

If the user decides to access the message center 28b, the system provides the user with an opportunity to view various display screens relating to, but not limited to, a message inbox display page (FIG. 13c); sent messages display page (FIG. 13d) or a deal box display page (FIG. 13e). FIG. 13f is a schematic of another embodiment of a deal box display page. FIG. 13i provides a schematic diagram of a chat centre display page.

In one embodiment, the deal box display page (FIG. 13e) provides a display screen where a user may check for special offers from businesses associated with the system, or online closet community. This is different from traditional "passive" advertisements that run on mobile applications or apps, and websites because for the deal box of the disclosure, the user is required to be "active" or perform a manual action to see advertisements. For instance, in one embodiment, the user is required to perform an action to open the deal box display page. Another advantage of the deal box of the disclosure is that the deal box may not be perceived as junk since the user is required to take the action to open the deal box In a preferred embodiment, the deal box display page is populated with pulled offers based on the user activity whereby the system includes an algorithm or method that pulls user activity data with respect to assets and matches the user with existing business offers. The user activity may include, but is not limited to, likes, posts, comments, messages, texts or any sort of data that is collected and associated with a particular user. For example, if a user "likes" 30 posts with Apple® mentions, 12 posts with Zara® mentions, the deal box display page for that user may be populated with existing Apple® & Zara® offers. Another example, if a user posts a lot of Nike® products or exchanges a lot of messages containing mentions of Nike® the deal box display page for that user may be populated with existing Nike® offers. In another embodiment, the deal box may be populated with pushed offers to the user whereby the system includes an algorithm that pushes existing business offers to the user based on the user profile and business-defined market for the business offers. For example, if a company is looking to advertise to 18 to 35 years old males in the Northeast USA, the deal box display page for 18 to 35 years old males in the Northeast USA will be populated with business or sales offers from the company. In yet another embodiment, the deal box display page may be populated with preferences-based offers whereby the system includes an algorithm that views existing user preferences on businesses or technology sectors and then retrieves existing business ads/offers that match user preferences. For example, the user may check in their preferences or settings that they always want to see any offers relating to electronics. In other embodiments, the deal box display page may include any combination of the different offers listed above.

In another embodiment, the offers within the deal box display page may be sorted based on an algorithm that scores the relevancy of the offer to the user based on the user's activity data and the user's profile. In one embodiment of determining relevancy, the system reviews the user preferences and places any business offers related to the user preference at a top of the deal box display page. The next sorting criteria may be any business offers which are based on user activity with the highest compatibility score. Thirdly, the system may determine business offers which are based on the user profile or demographic data. In some cases, business offers may overlap each of the criteria and therefore further analysis may be required. Also, business offers with closer upcoming expiry dates may be placed at a top of the list of business offers for display to the user.

Figure 14:
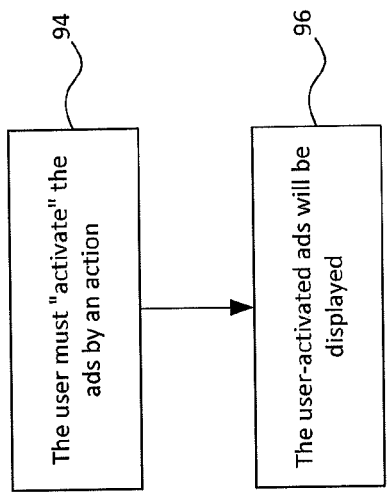
FIG. 14 is a flowchart outlining a method of user-activated business offer display.

With respect to user activated advertisement space or deal box, it is preferred that the user will not see the advertisements, discounts, coupons, promotions, samples, giveaways, offers, deals and the like within the deal box display page until they perform an action to enable the deal box display page and data to appear. In operation, as shown in the flowchart of FIG. 14, the user "activates" the advertisement via a prescribed action (which is sensed by the system) 94 and then the system provides the advertisements on a display screen 96 to the user. A unique property of the user activated advertising space, or deal box display page, is that after the user has activated the advertisements to be displayed, the user will only see relevant advertisements or business offers. The "user activated ad space" is a dedicated space for business offers or advertisements to be display. However, the deal box, or advertisement space does not appear (or is not passive) by default and a user must activate it by an action, whether that is clicking the link to open the deal box display page or by clicking a button to open the deal box display page. In another embodiment, the user may swipe an unlocking mechanism to unlock the deal box which is then populated with relevant business offers, coupons, discounts, deals, promotions, samples, or giveaways using the methods disclosed above.

Figure 15:
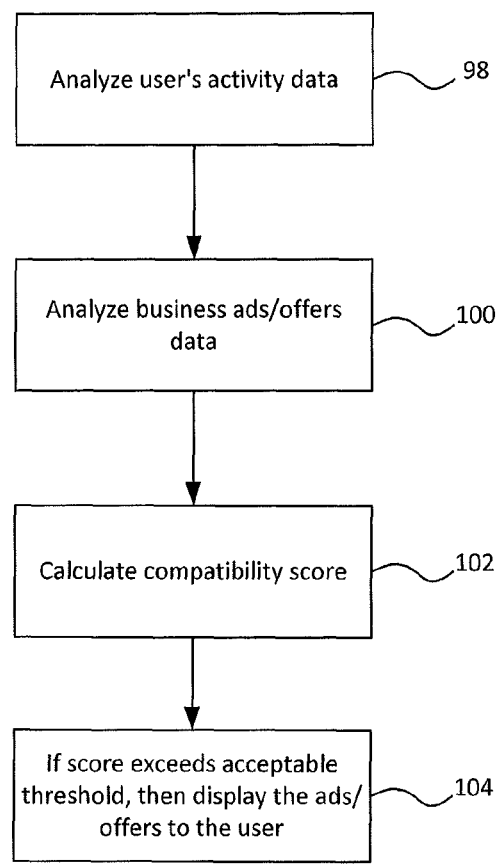
FIG. 15 is a flowchart outlining a method of providing pull offers to a user.

Turning to FIG. 15, a flowchart outlining a method of providing pull offers to a user is shown. The method includes analyzing a user's activity data 98 and then analyzing business advertisements or offers 100 which are available to the system or the online closet community. The business advertisements and offers may be stored in a central repository, such as the database, for ease of access. A compatibility score is then calculated 102. In one embodiment, if a first user has liked a post containing or relating to a first company or has posted a message or a note containing the company's name, the user's compatibility score with the company is increased. If a second user has liked a post or has posted a message or note pertaining to a second company, the second user's compatibility score with the first company will be seen as being less than the compatibility score of the first user and the first company. Depending on the threshold for the first company, it is likely that the first user will see a business offer from the first company but the second user will not unless there is other activity that the second user has performed with respect to the first company that would be included in the compatibility score calculation. Once the compatibility score is determined, if the score exceeds a predetermined threshold, then the system displays the business advertisements or offer to the user 104 via a display screen such as the deal box display page.

Figure 16:
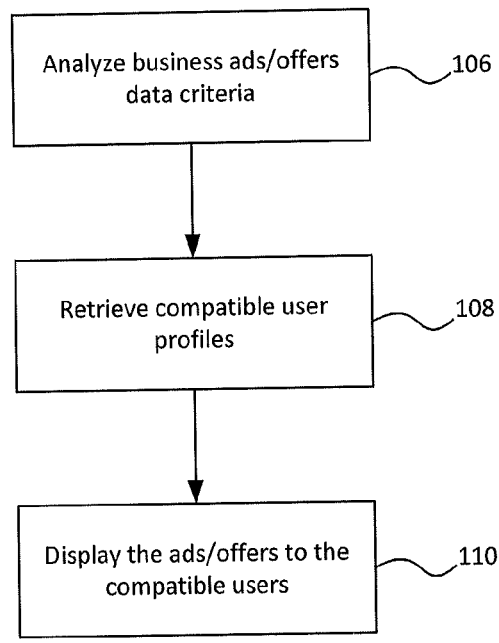
FIG. 16 is a flowchart outlining a method of providing push offers to a user.

Turning to FIG. 16, a flowchart outlining a method of providing push offers to a user is shown. The method includes analyzing business advertisements or offers to determine the target group or market that the business is hoping to attract 106 and then retrieving user profiles within the online closet community which are compatible to the target group defined by the business 108 and then displaying the business advertisements or offers to the compatible users 110 after the user has performed a specific action to retrieve the deal box display page.

Figure 17:
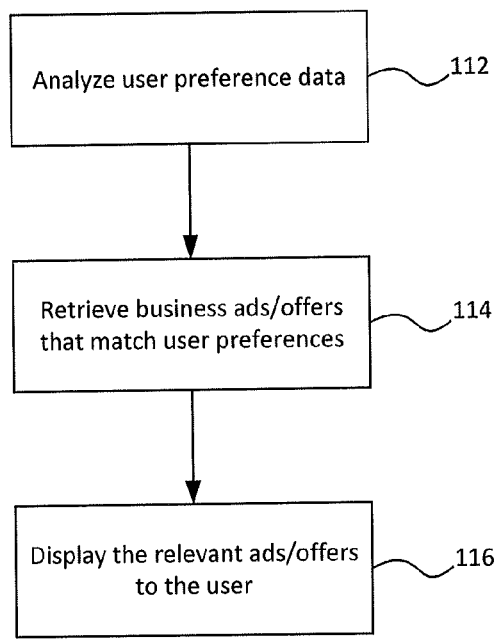
FIG. 17 is a flowchart outlining a method of providing preference based offers to a user.

Turning to FIG. 17, a flowchart outlining a method of providing preferences based offers to a user is shown. Initially, user preference data is analyzed by the system 112 and then business advertisements or offers which match the user's preferences are retrieved 114. After retrieving the matched business advertisements or offers, the system displays the relevant offers to the user 116 after the user has performed a specific action to retrieve the deal box display page.

If multiple business advertisements or offers are retrieved for display to the user, in a preferred embodiment, a method of sorting may be used to determine a relevancy of the business advertisements or offers to the user based on predetermined criteria, such as, but not limited to, the user's activity data and user profile data. In this manner, the business advertisements or offers which are more relevant to the user are displayed first.

Although described with respect to the online closer community of the disclosure, user "activated" advertisement space technology may be applied to social media companies or other technology companies that collect user data in which they want to apply this method of online/mobile advertising.

Figure 4A:
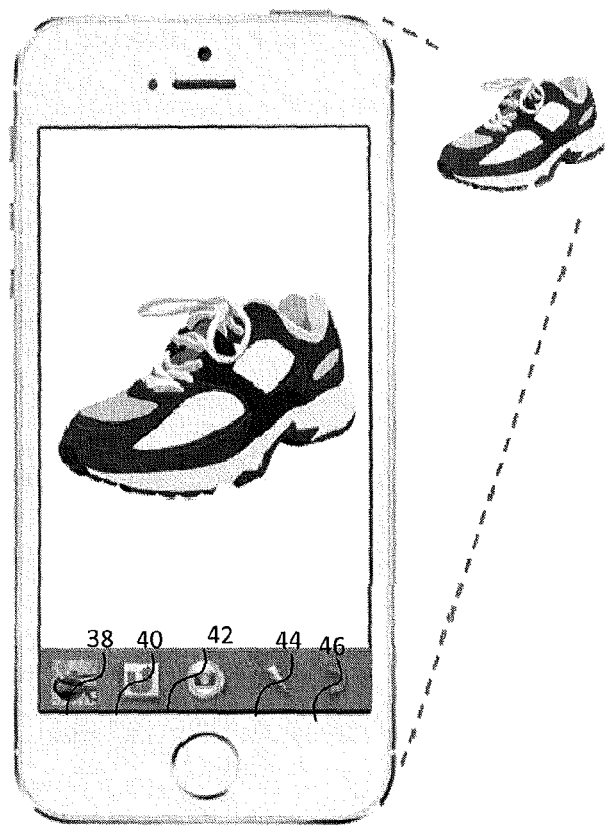
FIG. 4a is a schematic diagram of a camera input display screen.
Figure 4B:
FIG. 4b is another schematic diagram of a camera input display screen.

If the user decides to access the archive or store asset function 32, the user may be presented with a camera input display page such schematically shown in FIG. 4a or FIG. 4b. In the current example, if a camera is available on the device, the user may be able to perform certain functions such as, but not limited to, selecting an existing photo on the device to archive or store 38, switch to a front-facing camera 40, take a picture or perform an instant archive 42, turn on or turn off the camera flash 44 or go back to the previous screen 46. However, if the device does not contain a camera, when the user accesses the instant archive display page, the user may at least have the options to choose an existing photo which is stored on the device to archive or store the asset 38 or go back to the previous screen 46.

Figure 4D:
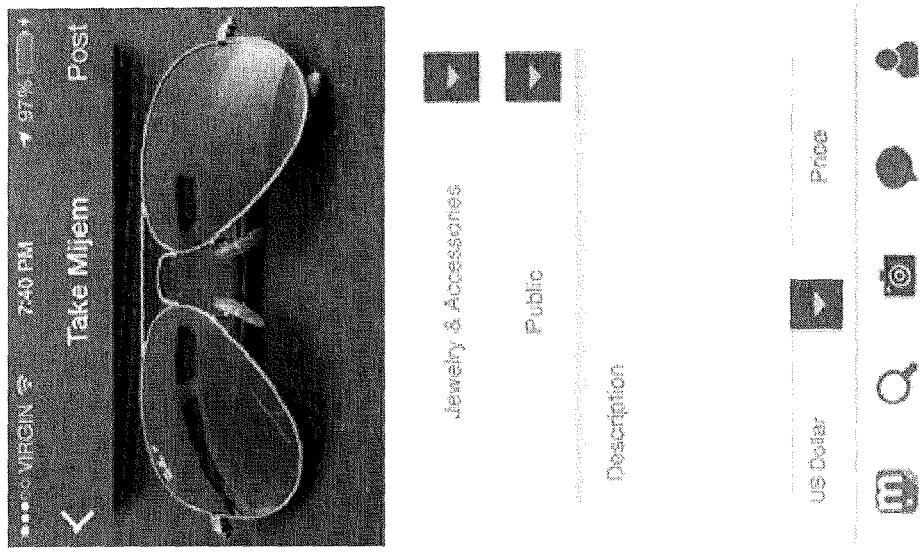
FIG. 4d is a schematic diagram of another embodiment of an asset description entry screen.
Figure 4C:
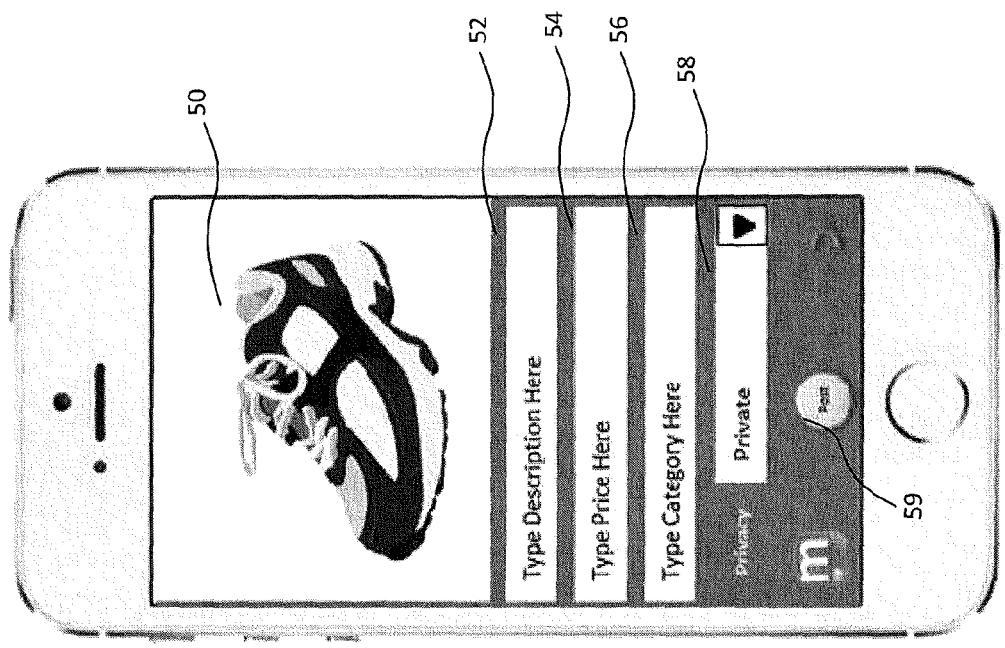
FIG. 4c is a schematic diagram of an asset description entry screen.

Once a photo 50 of an asset has been selected the user can complete the archiving process by entering information associated with the asset into an asset description display page such as schematically shown in FIG. 4c. In the current embodiment, this may involve inputting data associated with the photo of the asset such as, but not limited to, a description 52 of the asset, a price for the asset 54, a category for the asset 56, and/or a privacy setting for the asset 58. After completing the data input, the photo of the asset can be archived by clicking a post button 59 wherein the photo is saved into the database, preferably under the user identifier. Although disclosed in the context of an online closet community, the method of archiving, or instantly archiving an asset may be applicable or used in other applications. FIG. 4d provides another schematic diagram of a display screen where a user may be able to select a picture or photo to store into the online collection and then input data associated with the picture such as described above and then saved to the database.

Figure 5:
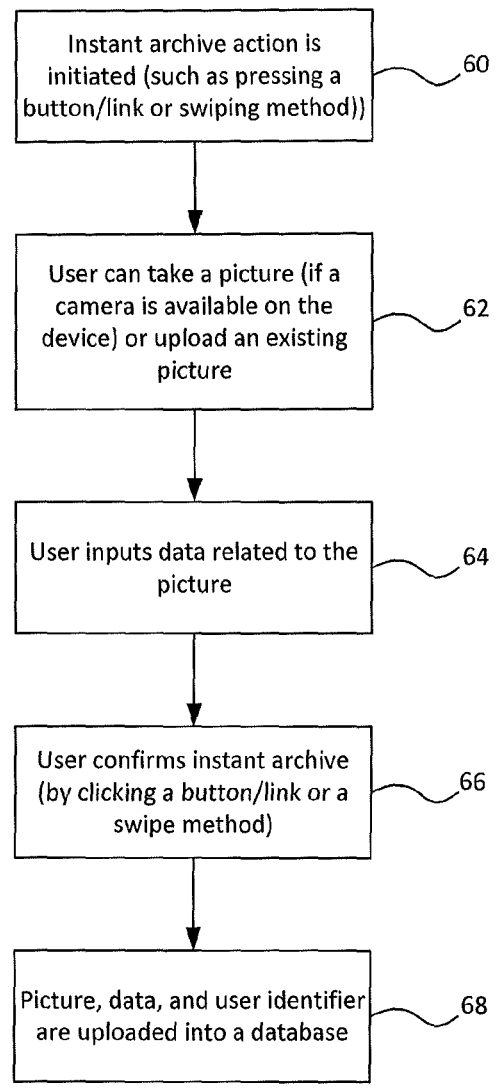
FIG. 5 is a flowchart outlining a method of instant archiving.

FIG. 5 provides a flowchart of a method of instant archiving for an online community. Firstly, the initiation of the instant archive application or functionality by a user is sensed 60. In one embodiment, this may be achieved by having a user press a button or click a link or to have the user swipe to access the functionality. This action is sensed by the system. After initiating the application, the user may then take a photo 62 or upload a photo or picture to the system. Data associated with the photo or picture may then be input by the user 64. After completion of the data input, the photo or picture can be archived or stored by the system. This may be performed by having the user click a button or link or via a swipe functionality 66. The photo or picture along with its data is then stored in a database 68.

When the user accesses the assets screen 30, the archived assets may be displayed and/or counted by category and a link with the count is created for each unique category tag. The link may appear in any shape or form on the assets screen display page. This allows the user to see what sort of categories he or she has archived and the count in each category. This method of grouping and count display may have applications outside of the current disclosure. A flowchart outlining a method of grouping, counting and link creation is shown in FIG. 7.

Figure 7:
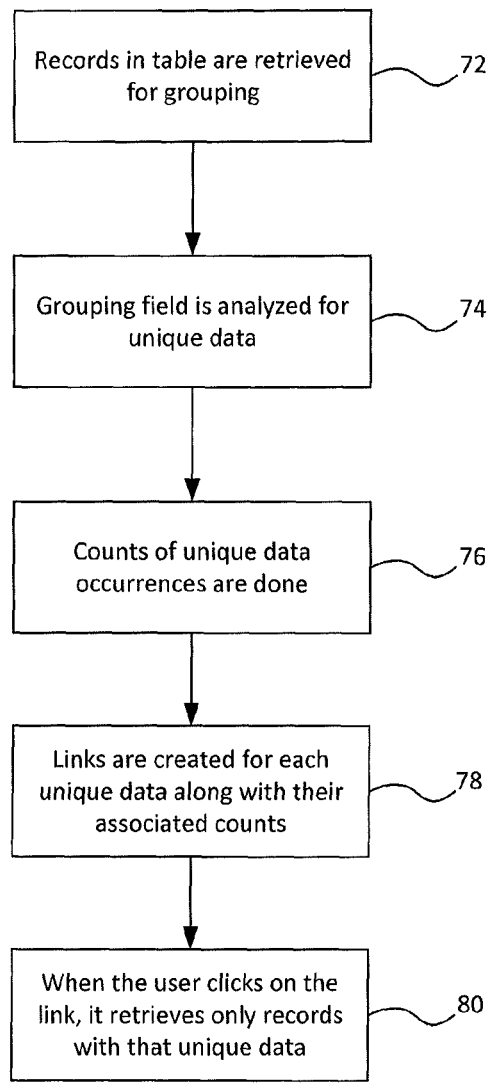
FIG. 7 is a flowchart outlining a method of grouping, count and link creation.

As shown in FIG. 7, initially, the data associated with the user that is stored in the database is retrieved 72. The data is preferably stored in a table of records within the database. The retrieved data is the prepared for grouping. In a preferred embodiment, a grouping field or counter is analyzed for unique data 74. In one embodiment, the grouping of the assets or items is performed by comparing "keywords" such as the category for each item. Counts of unique data occurrences are then performed 76 and links for each unique data along with their associated counts are created 78. The links are then presented on the display page to a user such that when the user clicks on the link the system retrieves only records associated with the unique data 80.

Figure 30:
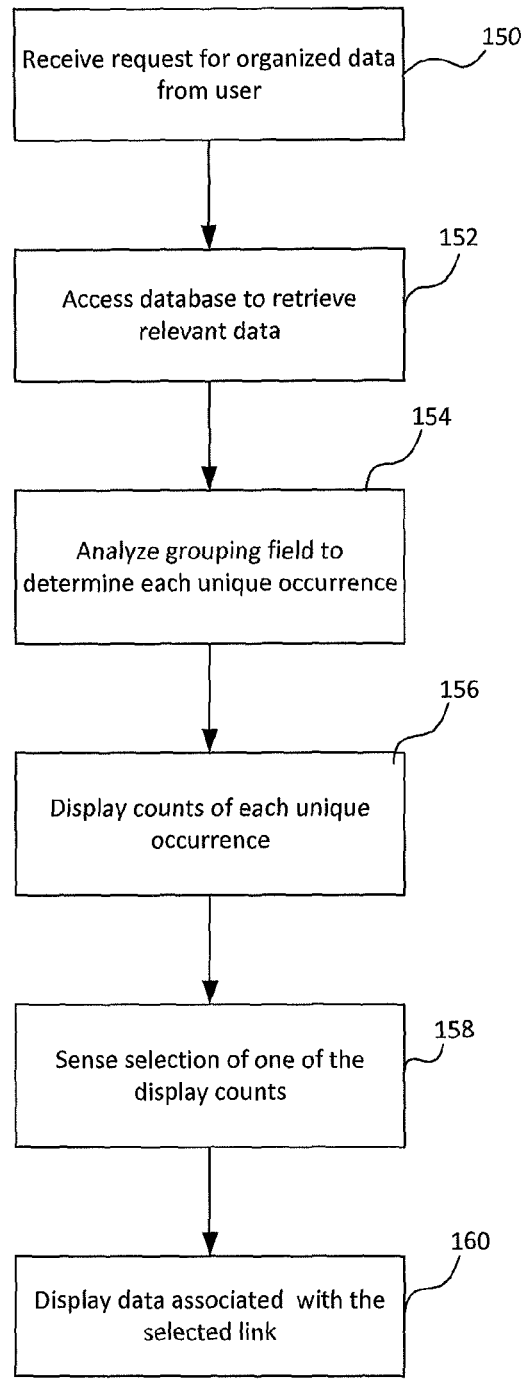
FIG. 30 is a flowchart outlining a method of grouping data by links with a counter.

Turning to FIG. 30, a flowchart outlining a method of grouping data by links with a counter is shown. Once the system determines that a user wishes to review organized data 150, the system accessed the database to retrieve the relevant data 152. The system then traverses the relevant data from the database to analyze a grouping field (or the field to which the data is to be organized) within the data to search for unique occurrences 154. Counts of each of the unique occurrences are then displayed by the system to the user 156 such as in the form of a link. The user may then click on one of the unique grouping field links (which is sensed by the system 158) and the system the displays the data associated with the grouping field 160.

For instance, if a user wishes to review the organized assets of data of User421 (as outlined in the table below), the user may be make that request 150 and the system obtains the data associated with User421 152. The system when obtains unique occurrences of the categories 154 and displaying links showing a count of 2 for clothing and 1 for electronics to the user 154. The user can then click on one of the links, such as the clothing link which is then sensed by the system 158 which retrieves the data associated with the two clothing assets which are then displayed to the user 160.

| UserID | Description | Category |
| --- | --- | --- |
| User421 | Red Blouse is nice | Clothing |
| User421 | Green Blouse is nice | Clothing |
| User421 | Camera for Sale | Electronics |

If the user decides to perform a search of the online closet community 34, the system may provide a search display page to the user. A schematic example of one embodiment of a search page is provided in FIG. 18. The user may then be allowed to, but is not limited to, search for assets with a filter; search for people within the online closet community; view a list of followers that are following the user or view the list of users that the user is following.

Figure 19B:
FIG. 19b is a combined search and search results display page.
Figure 19A:
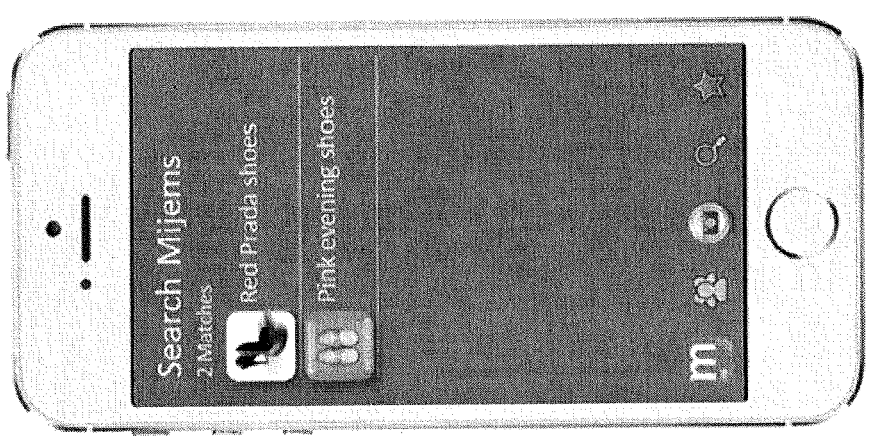
FIG. 19a is a schematic diagram of a search results display page.
Figure 18:
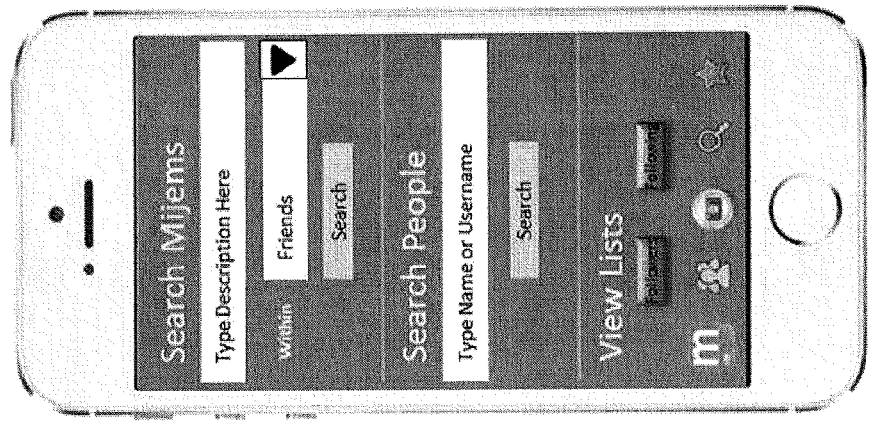
FIG. 18 is a schematic diagram of a search display page.

Turning to FIG. 19a, a search results display page which may be displayed by the system as a result of a search is shown. When a user accesses the search results display page, the user may see his or her search results and can perform other actions such as, but not limited to, refining the search parameters to further narrow the results. If the user is performing a search on assets, the results may be sorted by possession rank. In one embodiment, possession rank is calculated based on a variety of variables such as search text and asset data match score, user type (within network or public), user rating, and/or geography. FIG. 19b provides a search and search page results display screen. In other words, in the embodiment of FIG. 19b, the functionality of FIGS. 18 and 19a are combined.

Figure 20:
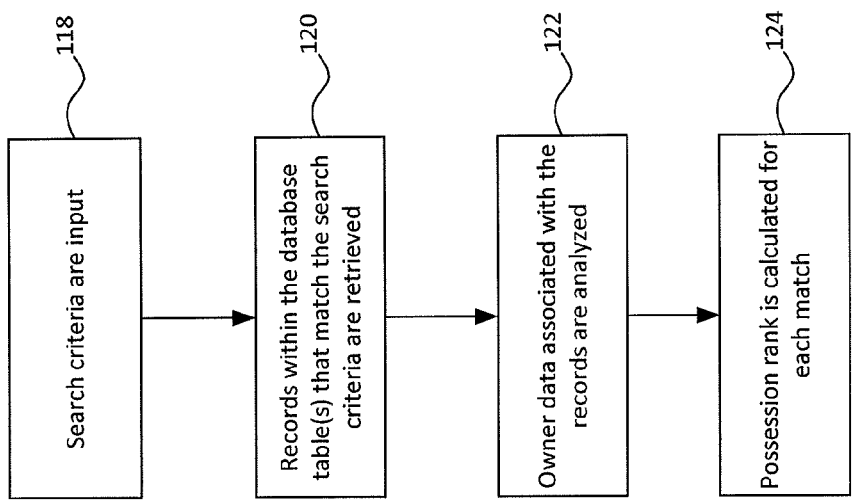
FIG. 20 is a flowchart outlining a method of determining possession rank.

Turning to FIG. 20, a flowchart outlining a method of determining possession rank is shown. Initially, a set of search criteria is received from the user 118 and the records within the database that match the search criteria are retrieved 120. The system may be required to perform a comparison of the search criteria with records within the database. Member data associated with the records is then analyzed 122 and a possession rank calculated for each match 124.

Figure 31:
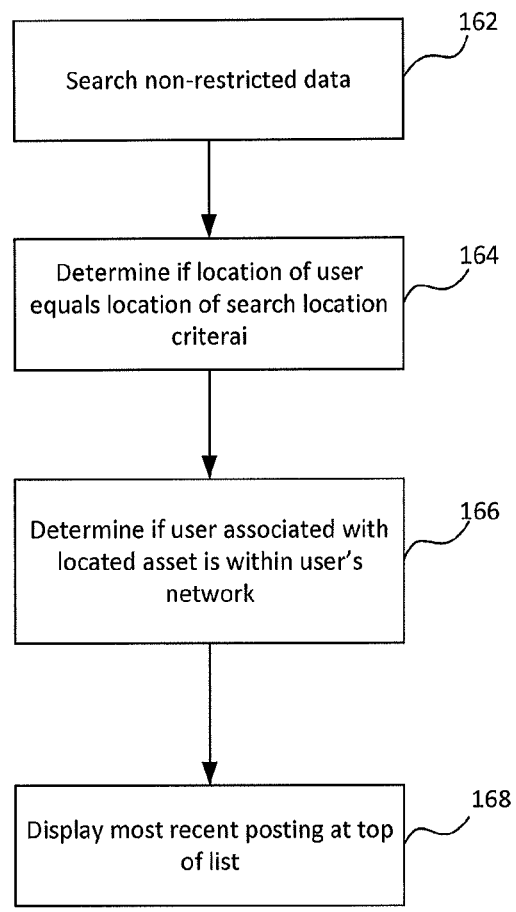
FIG. 31 is a flowchart outlining a method of calculating a possession rank.

FIG. 31 provides a flowchart outlining a method of calculating a possession rank. Firstly, non-restricted data is obtained from the database and searched for specific search terms, such as a category or a location 162. Non-restricted data refers to data which is that is searchable. In a preferred embodiment, the data preferably includes all search terms. A determination is then performed to confirm that the location associated with the user associated with an asset matches a search location criteria 164. A check is then performed to confirm that the user associated with the located asset is within the user's network 166. Finally, a most recent data posted (or ranking) is sorted with the most recent at a top of the list 168.

Figure 21B:
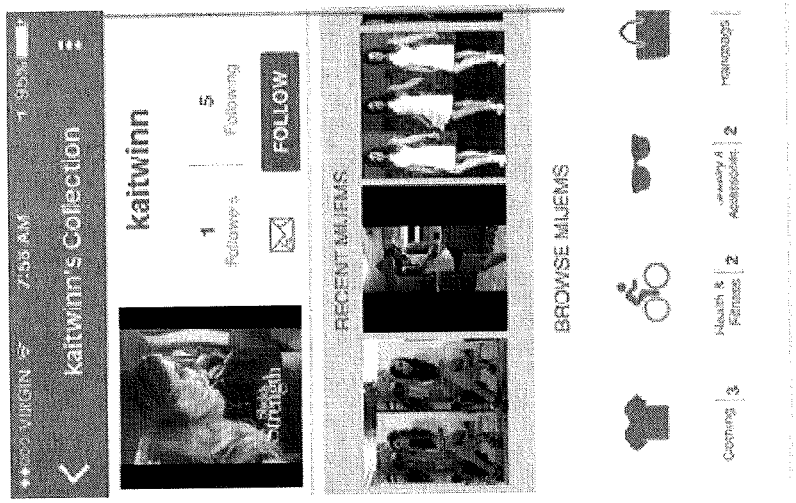
FIG. 21b is schematic diagram of another embodiment of a member profile display page.
Figure 21A:
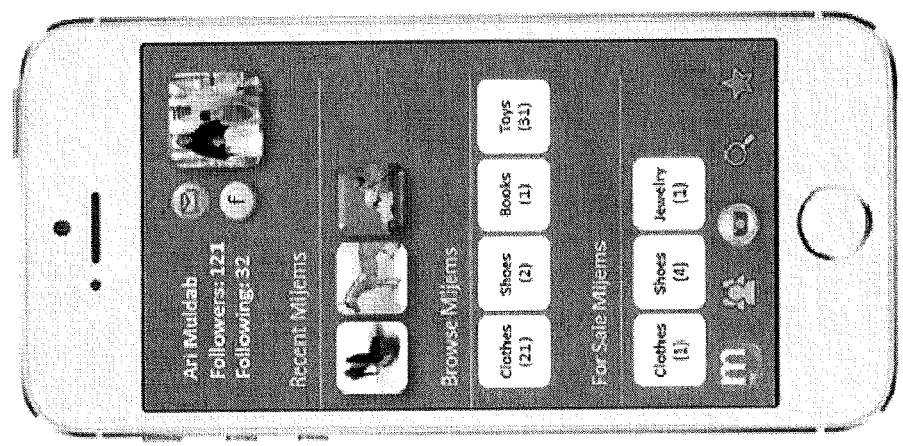
FIG. 21a is a schematic diagram of a member profile screen or display page.

If the user decides to view the page of another user, the system may display another member's profile page (schematically shown in FIG. 21a or FIG. 21b) to the user. As schematically shown in FIG. 21a, a member profile page may include, but is not limited to, the member's name; a profile picture of the member; functionality allowing the user to follow the member; profile statistics of the member; functionality to send a message to the member; recent assets which are associated with the member; assets grouped by tag with count associated with the member and "for trade", "for sale", or "on promo" status assets associated with the member.

Figure 22C:
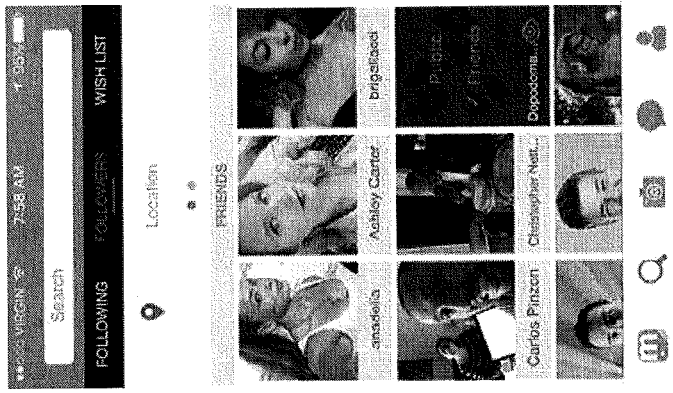
FIG. 22c is a schematic diagram of another member's followers screen.
Figure 22B:
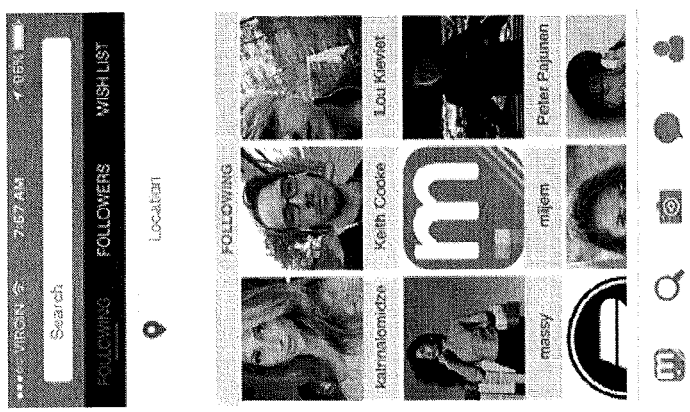
FIG. 22b is a schematic diagram of a member's following screen.
Figure 22A:
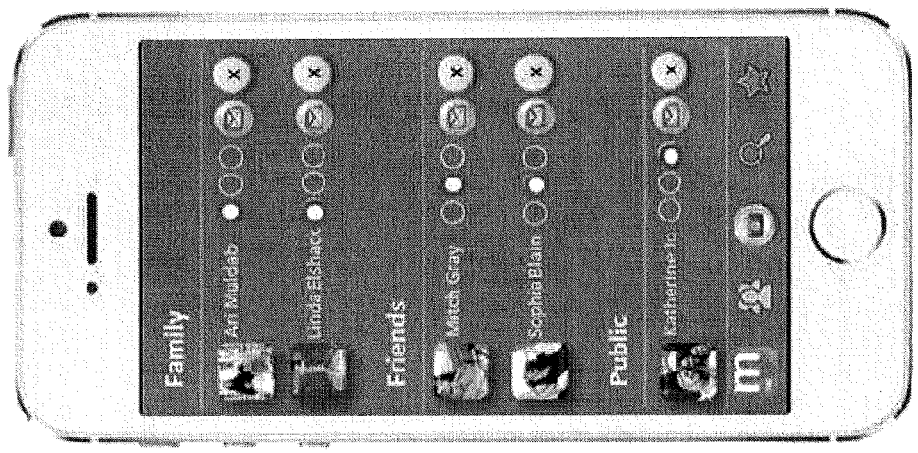
FIG. 22a is a schematic diagram of a member's followers screen.

If the user wishes to look at the members that are following the user (the user's followers) by clicking the followers button (as shown in FIG. 18), the system may display a user followers display page such as schematically shown in FIGS. 22a and 22c. FIG. 22b is a schematic diagram of a member's following display page. In reviewing this user followers display page, the user may, but is not limited to, view a list of members that the user has as followers; and/or message individual members. If the list of members that the user has as followers is grouped by contact type, the user may also remove members from the list and/or change the contact type.

When the user wants to change the type of contact that is associated with a member that the user has as a follower, the user can use a button or sliding selection. If a change is requested and performed by the user, the system updates this information in the database. In a preferred embodiment, a screen refresh is performed such that the listing of members is updated to reflect the new contact type.

Figure 23:
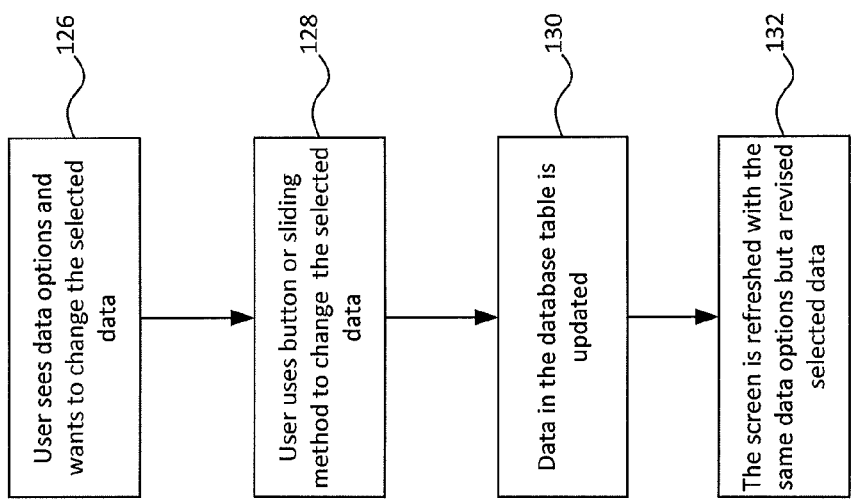
FIG. 23 is a flowchart outlining a method of data revision.

Turning to FIG. 23, a flowchart outlining a method of data revision is shown. Initially, a user can review their data options and determine if there is a need to change the data 126. The user may then initiate a change of the select data by clicking a button or using a sliding initiation (which is sensed by the system) 128. The system then updates the database to reflect the new information or the change of data 130 and a display screen is refreshed to reflect the revised data 132.

Figure 24B:
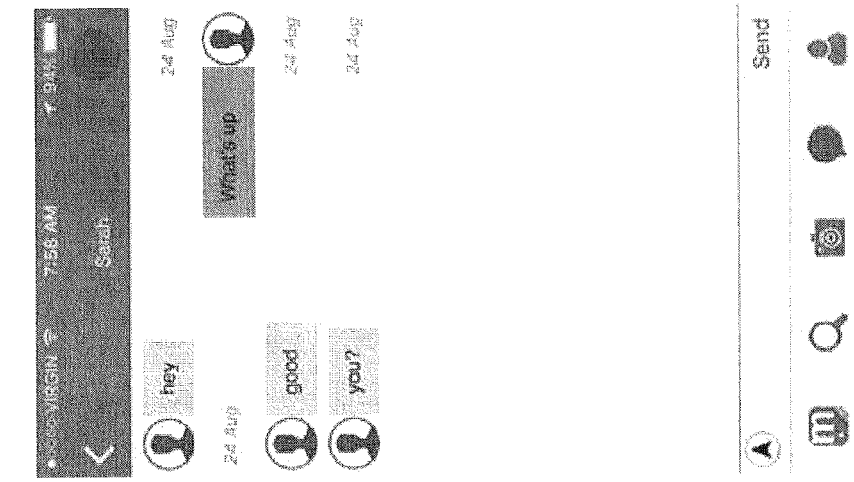
FIG. 24b is a schematic diagram of another embodiment of a message sending screen.
Figure 24A:
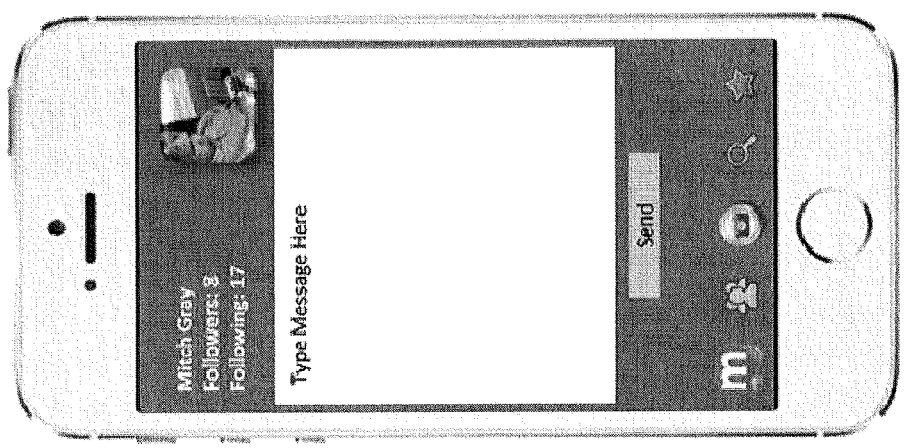
FIG. 24a is a schematic diagram of a message sending screen.

If a user decides to message another member within the system or online closet community, the system may provide a message send display screen (such as schematically shown in FIG. 24a or 24b) to the user. Use of such a messaging functionality will be understood by one skilled in the art.

Figure 25B:
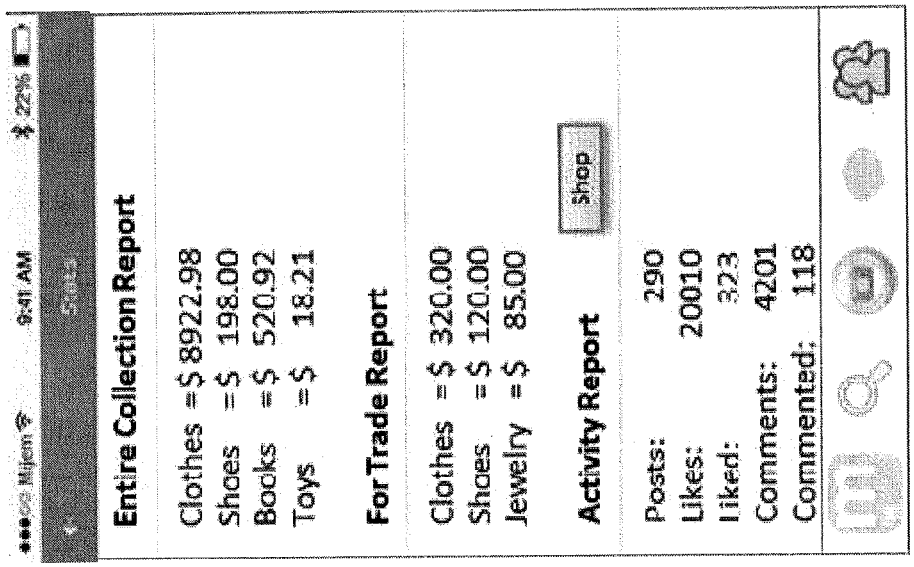
FIG. 25b is a schematic diagram of another embodiment of a points and statistics screen.
Figure 25A:
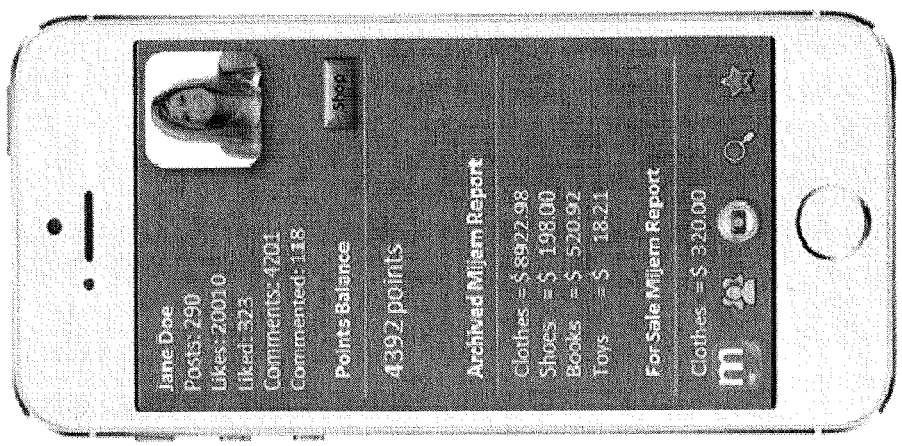
FIG. 25a is a schematic diagram of a points and statistics screen.

If the user decides to select or review their collected points and/or statistics, the system may provide a points and statistics screen (such as schematically shown in FIG. 25a) to the user. In the points and statistics screen, the user may he able to, but is not limited to, view general statistics on their engagement with the system or online closet community, view a report on their assets; view a report on their assets which have a "for trade" or "for sale" status; view advance reporting which relates to business account matters and/or view the user's points balance. Another schematic diagram of a points and statistics screen is shown in FIG. 25b. In this embodiment, the user may view a report on the value of their collection; view a report on the value of their "for trade" or "for sale" collection and/or view user statistics on their engagement within the online closet community and/or view the user's points balance.

In one embodiment of determining points, the system may determine social engagement metrics of the user with the system or online closet community. Variables include, but are not limited to, number of posts, number of likes received, number of likes given, etc. In a preferred embodiment, the system calculates an engagement score and translates the score into points where a higher level of engagement the user has with the system or online closet community, the higher the number of points achieved by the user.

Figure 26:
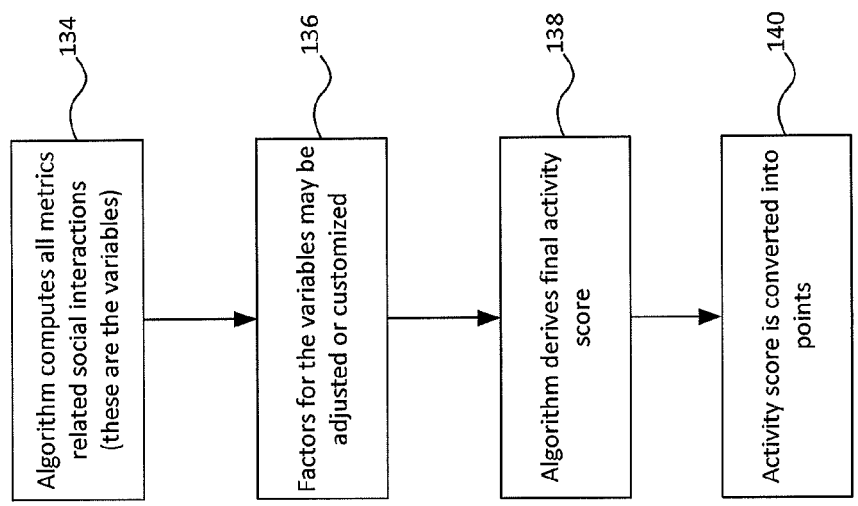
FIG. 26 is a flowchart outlining a method of converting user activity to points.

Turning to FIG. 26, a flowchart outlining a method of converting activity into points is shown. Initially, the system computes or determines metrics relates to a user's engagement with the system based on predetermined variables 134. Factors for the variables may then be adjusted or customized 136 and the system updated to reflect the new factors for the variables. The system then determines a final activity score 138 which is converted to a set of points 140. In one example, the score is equal to adjustable factors in relation to selected metrics. In other words, the score may be a combination of (the number of followers a user has)+(the number of members the user is following)+(the number of unique posts)+(the number of likes received)+(the number of likes given)+(the number of comments received)+(the number of comments given)+(the number of shares). These factors may then be adjusted so that a total score can be determined.

Figure 27:
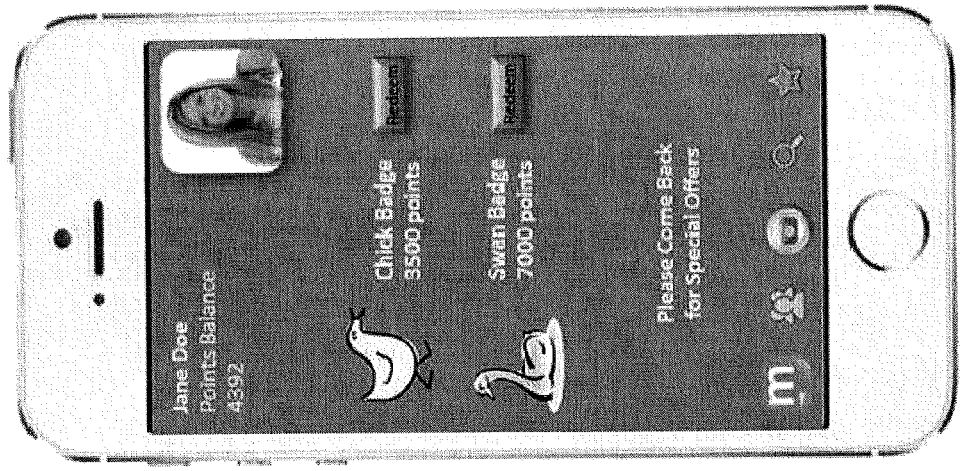
FIG. 27 is a points redemption display screen.

In order to redeem points, the system may provide a points redemption display page (such as schematically shown in FIG. 27) to the user. In the current embodiment, the user may redeem their points for a chick badge.

Figure 29:
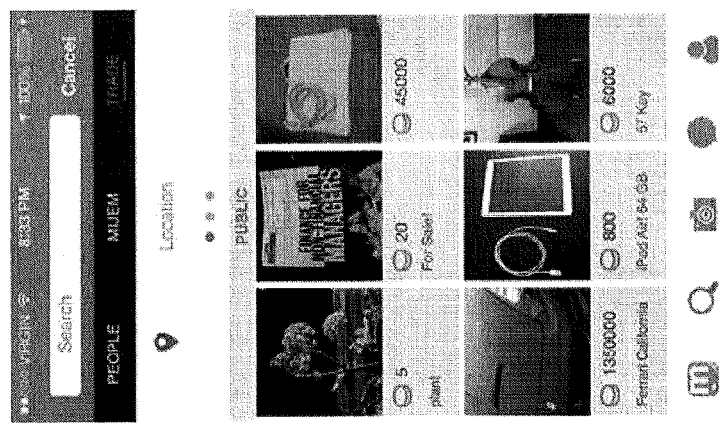
FIG. 29 is a schematic diagram of a search for trade or for sale or on promo and its results display screen.
Figure 28:
FIG. 28 is a schematic diagram of a trade or sale display screen.

Turning to FIG. 28, a schematic diagram of a trade display page is shown. In this display page, the system provides an opportunity for a user to trade one of their assets for the asset of another member or to list the cost for someone to obtain the asset. FIG. 29 provides a display screen of assets which are available for trade within a location specified by the user and could also be further filtered with a search criteria.

In another embodiment, the system may include GPS-based filters. In another embodiment, the system may include push notification for messages received, new followers and/or deal box offers.

Some of the features described in this document also can be applied outside of the online closet boundary. Also, the images in this document may change in appearance while maintaining providing a user with the opportunity to perform the same functionality.

In the preceding description, for purposes of explanation, numerous details are set forth in order to provide a thorough understanding of the embodiments. However, it will be apparent to one skilled in the art that other arrangements and embodiments would be feasible.

The above-described embodiments are intended to be examples only. Alterations, modifications and variations can be effected to the particular embodiments by those of skill in the art without departing from the scope of the application, which is defined solely by the claims appended hereto.

What is claimed is:

1. A method for data collection and processing within an independent social media online system comprising:
   receiving and storing records which are associated with a user from a database within the independent social media online system;
   monitoring, and analyzing, interactive non-advertisement social media related user activity within the independent social media online system via a processor;
   generating a user interface, via a computing device associated with the user, that displays an activation link, an activation button, or an on-screen unlocking mechanism for a display of business offers;
   sensing a direct user request, via the user interface on the computing device associated with the user based on interaction of the user with the computing device wherein the interaction includes clicking of the activation link, clicking of the activation button or swiping of the on-screen unlocking mechanism, to generate a list of business offers for display to the user;
   generating an engagement score wherein the engagement score is a sum of (a number of followers the user has) and (a number of members the user is following) and (a number of unique posts) and (a number of likes received) and (a number of likes given) and (a number of comments received) and (a number of comments given) and (a number of shares);
   dynamically creating the list of business offers based on the interactive non-advertisement social media related user activity within the independent social media online system and the engagement score from a set of business offers pre-stored in the database;
   transmitting the list of business offers to a display screen of the computing device associated with the user via an output module within the independent social media online system to be displayed within a user activated advertisement space; and
   displaying, via a deal box display page, the list of business offers, the deal box display page including the user activated advertisement space dedicated to displaying the list of business offers;
   wherein the independent social media online system is an online customer to customer (C2C) marketplace community, and the non-advertisement social media related user activity includes C2C activity, the C2C activity including interaction with assets of another customer in the C2C marketplace community and enabling one's assets for interaction by other customers in the C2C marketplace community;
   wherein the assets include clothing, toys or electronics;
   wherein the independent social media online system is an independent social media online closet system; and
   wherein the interaction with assets of the another customer include likes, posts and comments on the assets of the another customer.

2. The method of claim 1 wherein creating the list of business offers comprises:
   analyzing the interactive non-advertisement social media related user activity within the independent social media online system;
   retrieving and analyzing business offers pre-stored in the database;
   calculating compatibility scores between the user and the business offers based on the interactive non-advertisement social media related user activity within the independent social media online system; and
   determining the list of business offers based on the compatibility scores.

3. The method of claim 1 wherein creating the list of business offers comprises:
   analyzing criteria associated with business offers;
   retrieving a list of users from a database;
   determining users from the list of users which fit the criteria; and
   determining the list of business offers for the user based on the list of users which fit the criteria.

4. The method of claim 3 wherein the criteria is a target market group.

5. The method of claim 1 wherein creating the list of business offers comprises:
   analyzing user preference data stored within the database;
   retrieving business offers that match user preference data from the database; and
   determining the list of business offers based on the matched business offers.

6. The method of claim 1 further comprising: ranking the individual advertisements from the list of advertisements in relevant order wherein the relevant order is based on the non-advertisement social media related user activity or user profile.

7. An independent social media online system for data collection and processing comprising:
   a compatibility module for comparing business offers with interactive non-advertisement social media related user activity or user preference to create compatibility information;
   a points and statistics module for analyzing and monitoring user engagement with the system and for calculating points based on the user engagement and generating an engagement score wherein the engagement score is a sum of (a number of followers the user has) and (a number of members the user is following) and (a number of unique posts) and (a number of likes received) and (a number of likes given) and (a number of comments received) and (a number of comments given) and (a number of shares);
   an activation module for generating a user interface, via a user device, that displays an activation link, an activation button, or an on-screen unlocking mechanism for a display of business offers;
   a processor for sensing the user request via the user device based on interaction of the user with the computing device wherein the interaction includes clicking of the activation link, clicking of the activation button or swiping of the on-screen unlocking mechanism, to generate a list of business offers for display to the user prior to creating and displaying the deal box display page;
   a business offers module for determining a list of business offers, activated only when directly requested by the user, based on the compatibility information and the engagement score from a set of business offers pre-stored in the database;
   an output module for creating a deal box display page for viewing, by the user, the list of business offers, the deal box display page including user activated advertisement space dedicated to displaying the list of business offers;
   a transmission module for transmitting the display page to a-the user device for display to the user within a user activated advertisement space; and
   wherein the independent social media online system is an online customer to customer (C2C) marketplace community, and the non-advertisement social media related user activity includes C2C activity, the C2C activity including interaction with assets of another customer in the C2C marketplace community and enabling one's assets for interaction by other customers in the C2C marketplace community;
   wherein the assets include clothing, toys or electronics;
   wherein the independent social media online system is an independent social media online closet system; and
   wherein the interaction with assets of the another customer include likes, posts and comments on the assets of the another customer.

8. The system of claim 7 further comprising: a ranking module for ranking business offers in the list of business offers based on relevancy to the user.

9. The system of claim 7 wherein the output module creates a display page for viewing by the user based on the calculation of the points and statistics module.

10. The method of claim 1 wherein the set of pre-stored business offers are a set of business offers.

11. The method of claim 10 wherein the set of pre-stored business offers are created prior to being stored within a database.

12. The method of claim 1 wherein dynamically creating the list of business offers comprises: determining a relationship between the list of business offers and the user.

13. The method of claim 1 wherein the list of business offers within the user activated advertisement space is sorted based on relevancy of each of the list of business offers with respect to the user.

14. The method of claim 1 wherein the C2C activity further comprises messaging with other customers in the C2C marketplace.

15. The method of claim 1 wherein a business offer with a closest upcoming expiry date is placed at a top of the list of business offers.

16. The method of claim 1 wherein the assets comprise clothing, toys, electronics, accessories and shoes.

\* \* \* \* \*